United States Patent
Kwon et al.

(10) Patent No.: US 10,564,845 B2
(45) Date of Patent: Feb. 18, 2020

(54) MOBILE TERMINAL AND METHOD FOR CONTROLLING THE SAME

(71) Applicant: LG ELECTRONICS INC., Seoul (KR)

(72) Inventors: Yunmi Kwon, Seoul (KR); Jihye Ham, Seoul (KR); Jihee Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/614,445

(22) Filed: Jun. 5, 2017

(65) Prior Publication Data

US 2018/0165005 A1    Jun. 14, 2018

(30) Foreign Application Priority Data

Dec. 13, 2016   (KR) .......................... 10-2016-0169230

(51) Int. Cl.
*G06F 3/0488*    (2013.01)
*G06F 3/0489*    (2013.01)

(52) U.S. Cl.
CPC ...... *G06F 3/04886* (2013.01); *G06F 3/04897* (2013.01)

(58) Field of Classification Search
CPC .............. G06F 3/04886; G06F 3/0488; G06F 3/04897; G06F 2203/04803
See application file for complete search history.

(56) References Cited

U.S. PATENT DOCUMENTS

| | | | | |
|---|---|---|---|---|
| 7,705,833 B2* | 4/2010 | Kim | ..................... | G06F 3/04886 345/173 |
| 8,364,208 B2* | 1/2013 | Choi | ................... | H04M 1/0245 178/18.01 |
| 8,549,429 B2* | 10/2013 | Tsuruta | ................. | G06F 3/0488 715/767 |
| 8,692,778 B2* | 4/2014 | Kim | ...................... | G06F 3/0488 345/173 |
| 8,896,562 B2* | 11/2014 | Horiguchi | ............... | G06F 3/041 178/18.01 |

(Continued)

FOREIGN PATENT DOCUMENTS

| EP | 2741201 | 6/2014 |
|---|---|---|
| EP | 3101525 | 12/2016 |

OTHER PUBLICATIONS

European Patent Office Application Serial No. 17168121.6, Search Report dated Nov. 15, 2017, 8 pages.

*Primary Examiner* — Grant Sitta
(74) *Attorney, Agent, or Firm* — Lee, Hong, Degerman, Kang & Waimey

(57) ABSTRACT

The present invention relates to a mobile terminal ad a method of controlling therefor. More particularly, the mobile terminal includes a sensing unit, a display unit configured to output a soft key including at least one button, and a controller, the controller configured to sense a first input signal for selecting the soft key in a state that first content is outputted on the display unit, wherein the first input signal corresponds to a touch input signal for dragging a touch from a first point to a second point and wherein the first point corresponds to the button, the controller configured to execute a multi-window mode based on the first input signal, wherein the multi-window mode corresponds to a mode for outputting second content on the first content.

16 Claims, 21 Drawing Sheets

(56) References Cited

U.S. PATENT DOCUMENTS

| | | | | |
|---|---|---|---|---|
| 9,032,292 B2* | 5/2015 | Lavallee | G06F 9/543 | 178/18.01 |
| 9,046,986 B2* | 6/2015 | Park | G06F 3/0481 | |
| 9,329,698 B2* | 5/2016 | Lee | G06F 3/02 | |
| 9,329,776 B2* | 5/2016 | Amano | G06F 3/04886 | |
| 9,395,915 B2* | 7/2016 | Waeller | B60K 35/00 | |
| 9,612,673 B2* | 4/2017 | Lavallee | G06F 9/543 | |
| 9,612,713 B2* | 4/2017 | Kuscher | G06F 3/04886 | |
| 9,612,732 B2* | 4/2017 | Donahue | G06F 3/04845 | |
| 9,710,125 B2* | 7/2017 | Chiang | G06F 3/041 | |
| 9,753,612 B2* | 9/2017 | Lee | G06F 3/0482 | |
| 9,798,443 B1* | 10/2017 | Gray | G06F 3/0482 | |
| 9,841,944 B2* | 12/2017 | Wang | G06F 3/0484 | |
| 9,891,965 B2* | 2/2018 | Hong | G06F 9/542 | |
| 9,898,155 B2* | 2/2018 | Kim | G06F 3/0481 | |
| 2006/0020903 A1* | 1/2006 | Wang | G06F 3/0481 | 715/792 |
| 2007/0160345 A1* | 7/2007 | Sakai | G06F 3/04817 | 386/230 |
| 2007/0222769 A1* | 9/2007 | Otsuka | G01C 21/265 | 345/173 |
| 2007/0252822 A1* | 11/2007 | Kim | G06F 3/0362 | 345/173 |
| 2010/0081475 A1* | 4/2010 | Chiang | G06F 3/0483 | 455/564 |
| 2010/0088634 A1* | 4/2010 | Tsuruta | G06F 3/0481 | 715/800 |
| 2011/0134110 A1* | 6/2011 | Song | G06F 3/04815 | 345/419 |
| 2011/0310048 A1* | 12/2011 | B.R | G06F 3/04817 | 345/173 |
| 2012/0176322 A1* | 7/2012 | Karmi | G06F 3/04883 | 345/173 |
| 2013/0125045 A1* | 5/2013 | Sun | G06F 3/04883 | 715/788 |
| 2013/0171006 A1* | 7/2013 | Ma | H05K 7/20209 | 417/6 |
| 2013/0332881 A1* | 12/2013 | Yook | G06F 3/0481 | 715/781 |
| 2014/0089831 A1* | 3/2014 | Kim | G06F 3/0481 | 715/769 |
| 2014/0089833 A1* | 3/2014 | Hwang | G06F 3/04817 | 715/769 |
| 2014/0164991 A1* | 6/2014 | Kim | G06F 3/0481 | 715/794 |
| 2014/0351748 A1* | 11/2014 | Xia | G06F 3/0481 | 715/798 |
| 2015/0067579 A1* | 3/2015 | Jeong | G06F 3/0488 | 715/781 |
| 2015/0113455 A1* | 4/2015 | Kang | G06F 3/04842 | 715/765 |
| 2015/0169216 A1* | 6/2015 | Cho | G06F 3/04883 | 715/764 |
| 2015/0185980 A1* | 7/2015 | An | G06F 3/0482 | 715/803 |
| 2015/0186024 A1* | 7/2015 | Hong | G06F 9/542 | 715/800 |
| 2015/0242086 A1* | 8/2015 | Mindlin | G06F 3/0481 | 715/769 |
| 2016/0062552 A1* | 3/2016 | Jeong | G06F 3/0481 | 715/788 |
| 2016/0062639 A1* | 3/2016 | Hwang | G06F 3/04883 | 715/783 |
| 2016/0110028 A1* | 4/2016 | Choi | H04M 1/274583 | 715/733 |
| 2016/0139776 A1* | 5/2016 | Donahue | G06F 3/04845 | 715/781 |
| 2016/0288643 A1* | 10/2016 | Kotter | G06F 3/0488 | |

* cited by examiner

MOBILE TERMINAL AND METHOD FOR CONTROLLING THE SAME

Pursuant to 35 U.S.C. § 119(a), this application claims the benefit of earlier filing date and right of priority to Korean Application No. 10-2016-0169230, filed on Dec. 13, 2016, the contents of which are all hereby incorporated by reference herein in its entirety.

BACKGROUND OF THE INVENTION

Field of the Invention

The present invention relates to a mobile terminal and a method of controlling therefor, and more particularly, to a mobile terminal in which a multi-window mode is executed using a button included in a soft key while providing a long screen and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a mobile terminal using an extended screen ratio (18:9) compared to a legacy screen ratio (16:9) is developing. Users using an extended screen may consider a method of additionally utilizing an extra region generated by the extended screen. In particular, various soft keys are outputted in the extra region of a display to easily control contents outputted on a mobile terminal. A user can more conveniently control the contents using the soft keys.

SUMMARY OF THE INVENTION

Accordingly, an object of the present invention is to address the above-noted and other problems. An object of the present invention is to provide a mobile terminal configured to execute a multi-window mode for sensing an input signal selecting a soft key in a state that first content is outputted on a display unit and outputting second content on the first content based on the sensed input signal and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a sensing unit, a display unit configured to output a soft key including at least one button, and a controller, the controller configured to sense a first input signal for selecting the soft key in a state that first content is outputted on the display unit, wherein the first input signal corresponds to a touch input signal for dragging a touch from a first point to a second point and wherein the first point corresponds to the button, the controller configured to execute a multi-window mode based on the first input signal, wherein the multi-window mode corresponds to a mode for outputting second content on the first content.

According to one embodiment of the present invention, the multi-window mode may correspond to a mode for outputting the second content in a manner that the first content is overlaid with the second content.

According to one embodiment of the present invention, the soft key may include a first button, a second button, and a third button and the controller can determine the second content based on a button selected at the first point.

According to one embodiment of the present invention, the controller can determine a size of a multi-window region on which the second content is outputted based on a distance between the first point and the second point.

According to one embodiment of the present invention, if a second input signal for selecting the first button is sensed, the controller can control a previous screen of the first content to be outputted as the second content.

According to one embodiment of the present invention, if a third input signal for selecting a first object, which is outputted on the second content, is sensed, the controller can control a function corresponding to the first object to be performed on the first content.

According to one embodiment of the present invention, the third input signal may correspond to an input signal for touching the first object, dragging the touch, and releasing the touch on the first content.

According to one embodiment of the present invention, if the first object corresponds to a file, the controller can control the file to be executed on the first content.

According to one embodiment of the present invention, if a fourth input signal for selecting the second button is sensed, the controller can control a home screen including at least one icon to be outputted as the second content. In this case, the home screen can include a first icon.

According to one embodiment of the present invention, if a fifth input signal for selecting a second object, which is outputted on the first content, is sensed, the controller can terminate the multi-window mode and execute third content corresponding to the first icon on the display unit. In this case, the third content can be outputted while information on the second object is included in the third content.

According to one embodiment of the present invention, the fifth input signal may correspond to a touch input signal for touching the second object and dragging the touch to a location at which the first icon is outputted.

According to one embodiment of the present invention, if a sixth input signal for selecting a third object, which is outputted on the first content, is sensed, the controller can control a second icon corresponding to the third object to be generated and outputted on the home screen.

According to one embodiment of the present invention, the sixth input signal may correspond to an input signal for touching the third object, dragging the touch, and releasing the touch on an empty space of the home screen.

According to one embodiment of the present invention, if the third object corresponds to an image, the controller can control the image to be outputted as a background screen of the home screen.

According to one embodiment of the present invention, if a seventh input signal for selecting the third button is sensed, the controller can control a list of activated contents to be outputted as the second content. In this case, the list of activated contents may correspond to a list of at least one or more contents currently activated at the background of the mobile terminal outputted in a thumbnail form.

According to one embodiment of the present invention, the controller can determine the number of activated contents included in the outputted list of activated contents based on the size of the outputted multi-window region.

According to one embodiment of the present invention, the controller can control a first activated content corresponding to a location at which the touch of the seventh input signal is released to be outputted on the multi-window region as the second content.

According to one embodiment of the present invention, the controller can determine an amount of detail information of the outputted second content based on the size of the multi-window region.

According to one embodiment of the present invention, if an eighth input signal for selecting a predetermined line of the multi-window region is sensed, the controller can control the size of the multi-window region according to the eighth input signal.

To further achieve these objects and other advantages and in accordance with the purpose of the invention, as embodied and broadly described herein, according to a different embodiment, a method of controlling a mobile terminal, includes the steps of outputting a soft key including at least one button on a display unit, sensing a first input signal for selecting the soft key in a state that first content is outputted on the display unit, wherein the first input signal corresponds to a touch input signal for dragging a touch from a first point to a second point and wherein the first point corresponds to the button, and executing a multi-window mode based on the first input signal, wherein the multi-window mode corresponds to a mode for outputting second content on the first content.

Advantageous effects of a mobile terminal according to the present invention and a method of controlling therefor are described in the following.

According to at least one or more embodiments of the present invention, a user is able to execute a multi-window mode using at least one or more buttons included in a soft key.

According to at least one or more embodiments of the present invention, a user is able to use a previous screen of outputted content in a multi-window region using a first button.

According to at least one or more embodiments of the present invention, a user is able to use a home screen in a multi-window region using a second button.

According to at least one or more embodiments of the present invention, a user is able to use content activated in a background in a multi-window region using a third button.

An additional scope capable of being applied to the present invention is going to be clear based on the description described in the following. Since various changes and modifications changed and modified within the idea and the scope of the present invention are clearly understood by those skilled in the art, it is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
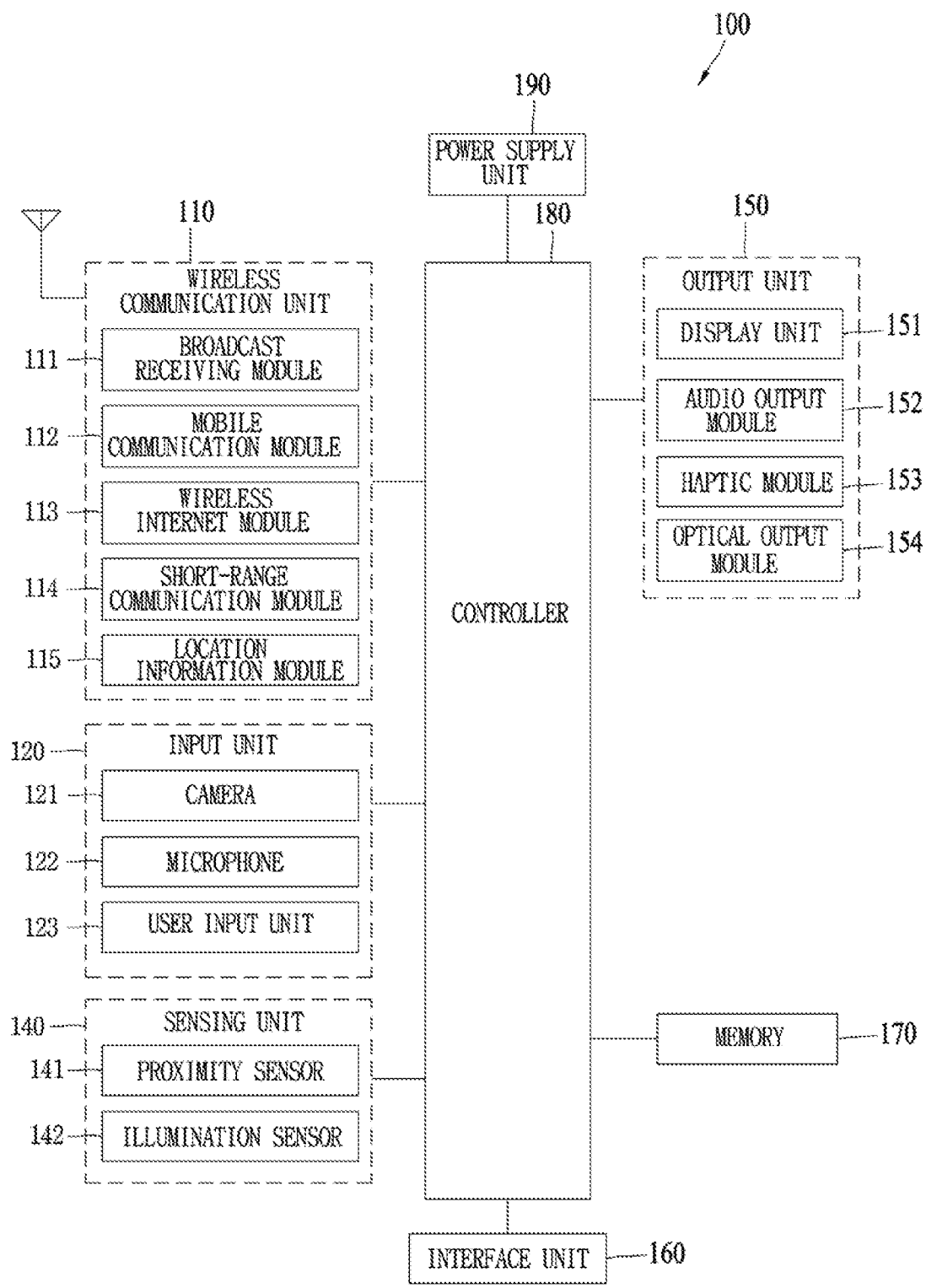
FIG. 1A is a block diagram of a mobile terminal in accordance with the present disclosure.
Figure 1B:
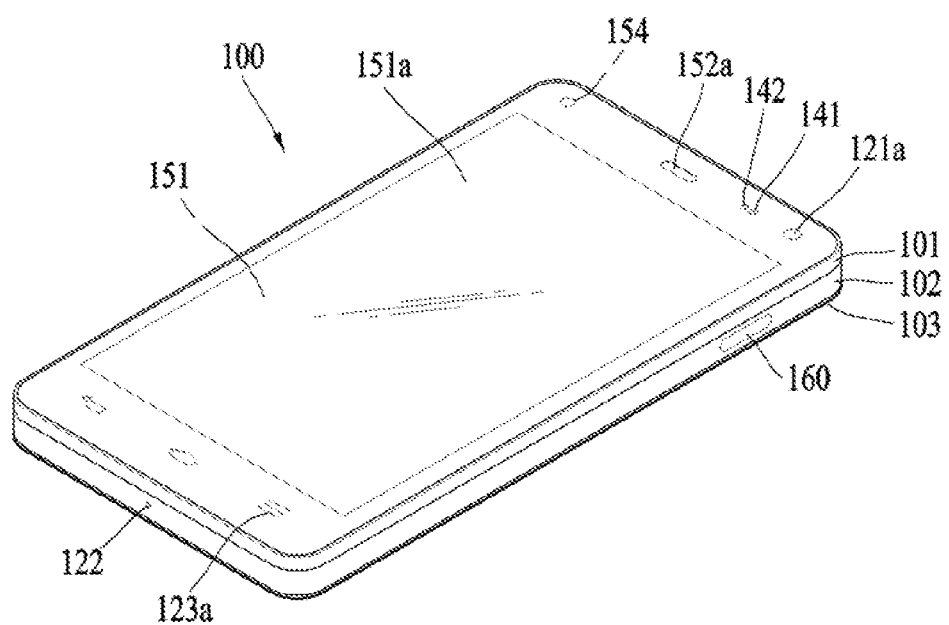
FIGS. 1B and 1C are conceptual views of one example of the mobile terminal, viewed from different directions.
Figure 1C:
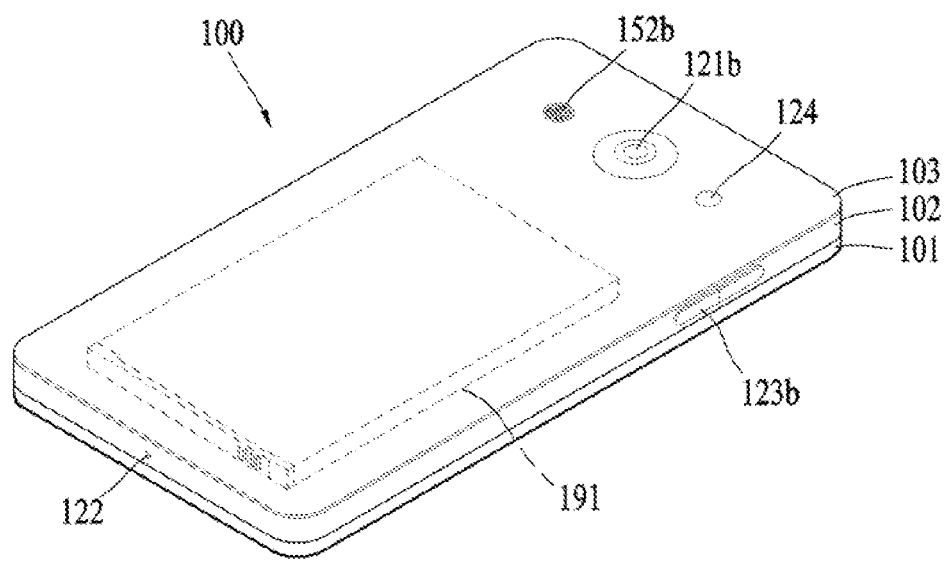

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
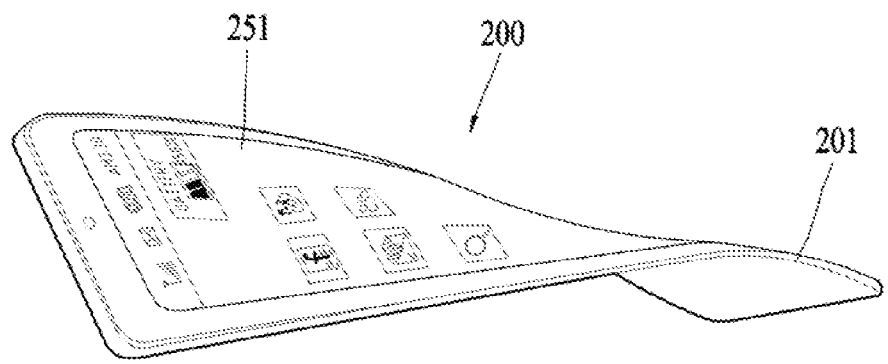
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
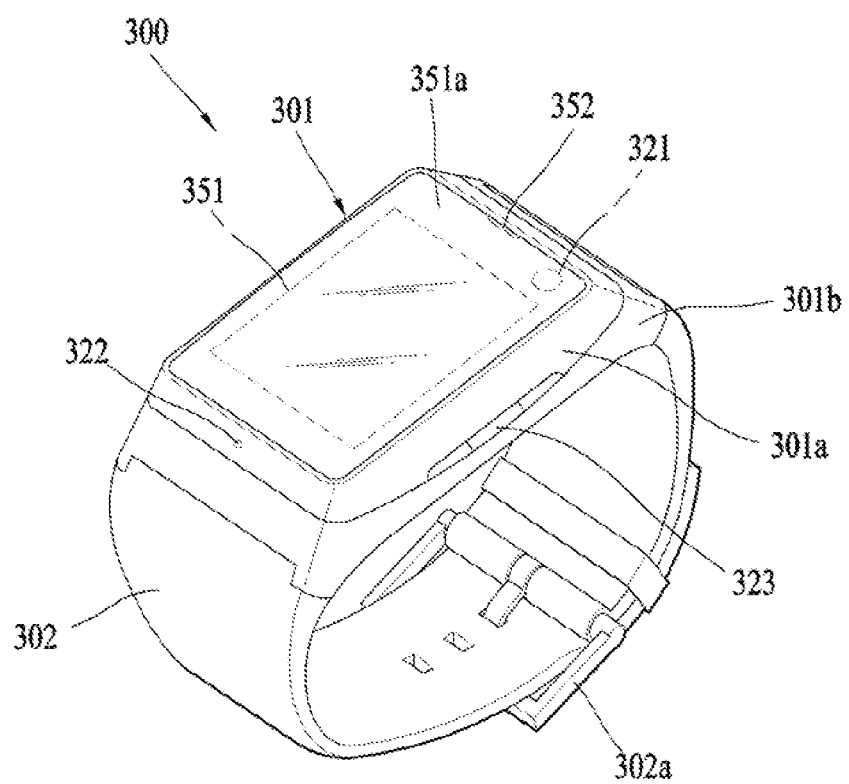
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-IC.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

A mobile terminal described in FIGS. 4 to 21 can be implemented by one of mobile terminals 100/200/300 shown in FIGS. 1 to 3.

In the following, embodiments of the present invention are explained with reference to FIGS. 4 to 21. In explaining and understanding the embodiments of the present invention, it may refer to the contents mentioned earlier in FIGS. 1 to 3.

Figure 4:
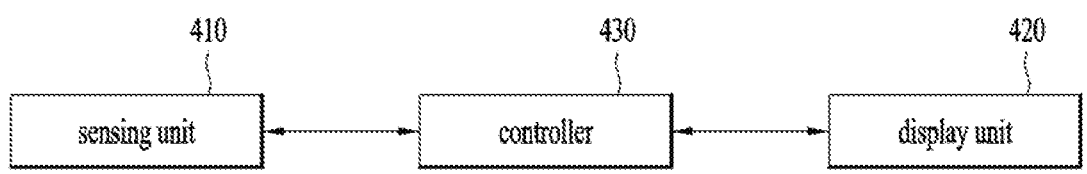
FIG. 4 is a block diagram for explaining configuration modules of a mobile terminal according to one embodiment of the present invention.

FIG. 4 is a block diagram for explaining configuration modules of a mobile terminal according to one embodiment of the present invention.

Referring to FIG. 4, a mobile terminal according to one embodiment of the present invention can include a sensing unit 410, a display unit 420, and a controller 430.

The sensing unit 410 senses various inputs inputted on the mobile terminal by a user and environment of the mobile terminal and forwards a sensed result to the controller to enable the controller 430 to perform operations according to the result. In the present invention, the sensing unit 410 is installed in the display unit 420 and can be implemented by a touch screen. And, the sensing unit 410 can also be implemented by the sensing unit 140 shown in FIG. 1a in the present invention.

According to one embodiment of the present invention, the sensing unit 410 can sense an input signal for selecting a soft key outputted on the display unit 420. More specifically, the sensing unit 410 can sense an input signal for touching and dragging a first point of the soft key and releasing the touch at a second point. Similarly, the sensing unit 410 can sense an input signal for selecting an object included in content rather than the soft key. More specifically, the sensing unit 410 can sense an input signal for touching an object included in second content for a predetermined time, dragging the touch, and releasing the touch at first content. And, the sensing unit 410 can sense an input signal for selecting a predetermined line of a multi-window region. Regarding this, it shall be explained in detail in the following.

The display unit 420 can display visual information. In this case, the visual information can include a text, an indicator, an icon, content, an application, an image, a video, and the like. And, the display unit 420 can output the visual information on a screen based on a control command of the controller 430. And, the display unit 420 can be implemented by the display 151 mentioned earlier in FIG. 1a or the display unit 351 mentioned earlier in FIG. 3a in the present invention.

According to one embodiment of the present invention, the display unit 420 can output a soft key including one or more buttons. And, the display unit 430 can output second content on first content in a state that the first content is outputted. And, the display unit 430 can output a previous screen of the first content, a home screen, an activated content list, and the like on the second content. Regarding this, it shall be explained in detail in the following.

The controller 430 processes data, controls each of the units of the mobile terminal, and can control data transmission/reception between the units. In the present invention, the controller 430 can be implemented by the controller 180 mentioned earlier in FIG. 1a.

As one embodiment of the present invention, operations performed by the mobile terminal can be controlled by the controller 430. Yet, for clarity, it is explained as the operations are commonly performed/controlled by the mobile terminal in the drawings and the description.

Figure 5:
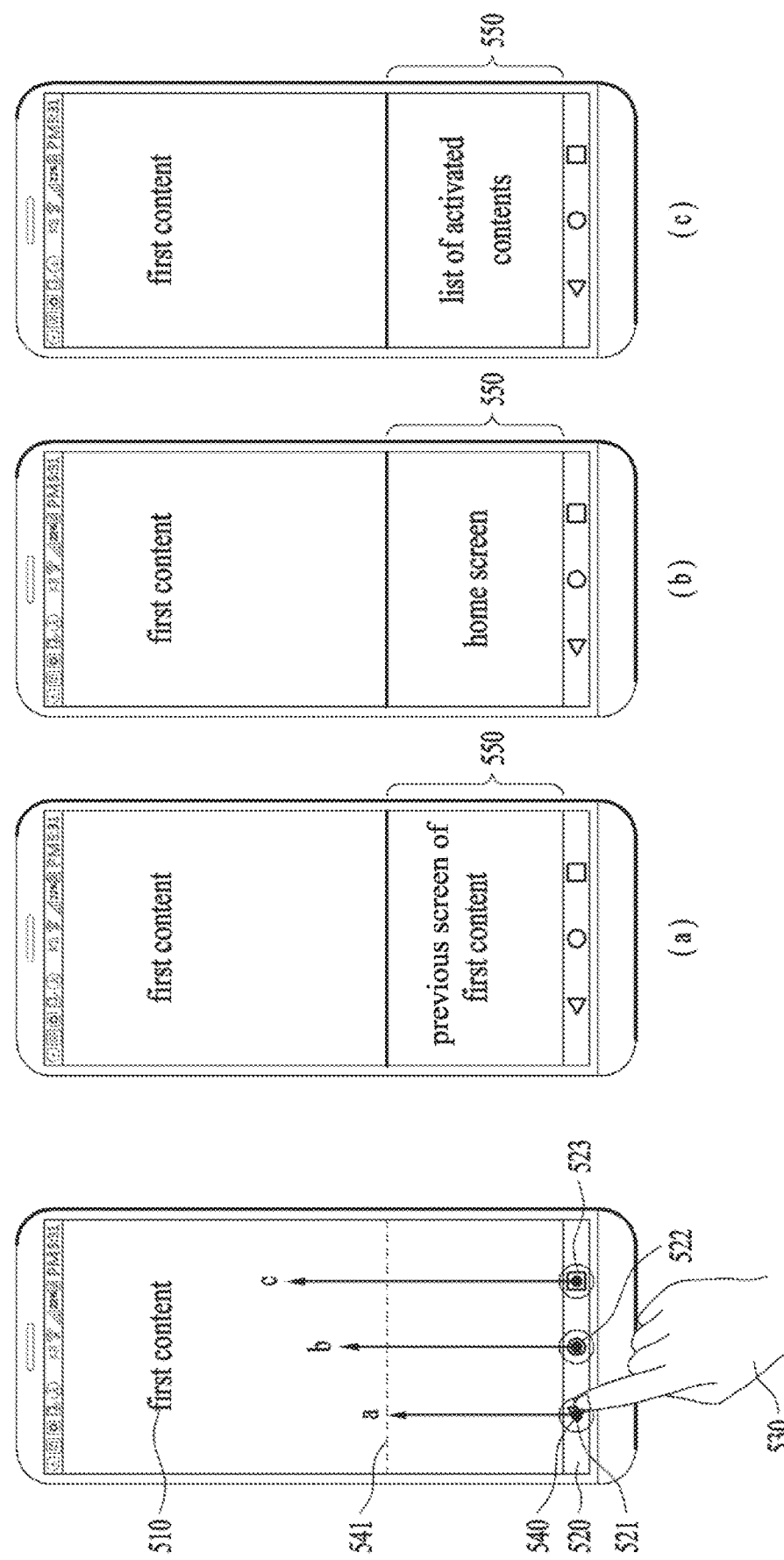
FIG. 5 is a diagram for explaining an embodiment of outputting content on a multi-window region in a mobile terminal according to one embodiment of the present invention.

FIG. 5 is a diagram for explaining an embodiment of outputting content on a multi-window region in a mobile terminal according to one embodiment of the present invention. In the embodiment of FIG. 5, explanation on content overlapped with the content of FIG. 4 is omitted.

Referring to the first drawing of FIG. 5, a mobile terminal can output first content 510 on the display unit. In this case, the first content 510 can include at least one object. In this case, the first content 510 can include a lock screen, a home screen, a widget and various applications. The at least one object included in the first content 510 can be differently determined according to a type of the first content 510. For example, if the first content 510 corresponds to a home screen, the at least one object may correspond to an icon and a widget outputted on the home screen. Regarding this, it shall be explained in detail in the following.

The mobile terminal can output a soft key 520 on the display unit. In this case, the soft key 520 may correspond to a control key outputted on the display unit to control the outputted first content. In particular, the soft key 520 can perform a function similar to a function of the legacy user input unit (123 in FIG. 1a, e.g., a push key (mechanical key)) while having a difference in mobility only in a manner of being outputted on the display unit. And, the soft key 520 can include a navigation bar, a docking bar, a second screen bar, a notification bar, and the like.

According to one embodiment of the present invention, the soft key 520 can include at least one key. In one embodiment of the present invention, the soft key includes a first button 521, a second button 522, and a third button 523. For example, the soft key 520 can include a back key 521, a home key 522, and a recent key 523. In this case, the back key 521 corresponds to a key for controlling a previous screen of the outputted first content 510 to be outputted, the home key 522 corresponds to a key for controlling a home screen to be outputted, and the recent key may correspond to a key for controlling a list of contents currently activated in the background of the mobile terminal to be outputted. And, a function included in the soft key 520 can be predetermined at the time of manufacturing the mobile terminal and can be changed by a user. And, it is apparent that an array of keys included in the soft key 520 is changeable.

In FIG. 5, although it is depicted as the soft key 520 is outputted all the time, the mobile terminal can output the soft key 520 only when a predetermined user input signal is sensed. For example, the mobile terminal can output the soft key 520 only when a knock-on input signal of a user is sensed.

According to one embodiment of the present invention, the mobile terminal can sense a first input signal 530 for selecting a soft key 520 in a state that first content 510 is outputted on the display unit. Hence, the mobile terminal can execute a multi-window mode based on the first input signal 530. In this case, the multi-window mode may correspond to a mode for outputting second content on the first content 510.

According to one embodiment of the present invention, the first input signal 530 may correspond to a touch input signal for dragging a touch from a first point 540 to a second point 541. In this case, a position of the first point 540 may correspond to a button included in the soft key 520. For example, the position of the first point 540 may correspond to a position at which a first button 521 is outputted.

According to one embodiment of the present invention, the mobile terminal can determine second content based on a button selected from the first point 540. More specifically, if the first input signal 530 is sensed, the mobile terminal can determine the second content based on a button corresponding to the position of the first point 540.

For example, if the first button 521 is selected by the first input signal 530, the mobile terminal can output a previous screen of the first content 510 as the second content. And, if a second button 522 is selected by the first input signal 530, the mobile terminal can output a home screen as the second content. And, if a third button 523 is selected by the first input signal 530, the mobile terminal can output a list of activated contents as the second content. Regarding this, it shall be explained in detail in the following.

According to one embodiment of the present invention, if the first input signal 530 is sensed in a state that the first content 510 is outputted, the mobile terminal can execute a multi-window mode to output the second content on a multi-window region 550. In this case, the mobile terminal can output the second content on the first content 510 in a manner of overlaying the first content 510 with the second content or can output the second content while the output of a part of the first content 510 is stopped.

In this case, the multi-window region 550 may correspond to an overlay region which is determined based on a distance between the first point 540 and the second point 541 on the first content 510. More specifically, the mobile terminal can configure a region between the top of the soft key 520 and the bottom of the second point 541 as the multi-window region 550 according to the first input signal 530.

For example, if the first input signal 530 is sensed in a state that a message application is executed on the display unit, the mobile terminal can output the multi-window region on the message application.

According to one embodiment of the present invention, the mobile terminal can determine a size of the multi-window region 550 at which the second content is outputted based on a distance between the first point 540 and the second point 541. In particular, if the first input signal for dragging a touch from the first point 540 to the second point 541 is sensed, the mobile terminal can configure the distance between the first point 540 and the second point 541 as a height of the multi-window region 550. And, if the first input signal for dragging a touch from the first point 540 to the second point 541 is sensed, it is apparent that the mobile terminal can gradually increase a size of the multi-window region 550.

As mentioned in the foregoing description, the size of the multi-window region 550 increases based on the distance between the first point 540 and the second point 541. Yet, it is apparent that the size of the multi-window region 550 can also be determined by default at the time of manufacturing the mobile terminal. For example, the mobile terminal can differently configure a default size of the multi-window region 550 depending on the first button 521, the second button 522, or the third button 523.

In the following, FIG. 5 (a) is a diagram for explaining an embodiment that the first input signal 530 selects the first button 521, FIG. 5 (b) is a diagram for explaining an embodiment that the first input signal 530 selects the second button 522, and FIG. 5 (c) is a diagram for explaining an embodiment that the first input signal 530 selects the third button 523.

Referring to FIG. 5 (a), if the first input signal 530 for selecting the first button 521 is sensed in a state that the first content 510 is outputted, the mobile terminal can execute a multi-window mode. In the embodiment of FIG. 5 (a), if the multi-window mode is executed, the mobile terminal can output a previous screen of the first content 510 on the multi-window region 550 in the state that the first content 510 is outputted. Regarding this, it shall be explained in detail with reference to FIGS. 6 to 11.

Referring to FIG. 5 (b), if the first input signal 530 for selecting the second button 522 is sensed in a state that the first content 510 is outputted, the mobile terminal can execute a multi-window mode. In the embodiment of FIG. 5 (b), if the multi-window mode is executed, the mobile terminal can output a home screen on the multi-window region 550 in the state that the first content 510 is outputted. Regarding this, it shall be explained in detail with reference to FIGS. 12 to 18.

Referring to FIG. 5 (c), if the first input signal 530 for selecting the third button 523 is sensed in a state that the first content 510 is outputted, the mobile terminal can execute a multi-window mode. In the embodiment of FIG. 5 (c), if the multi-window mode is executed, the mobile terminal can output a list of activated contents on the multi-window region 550 in the state that the first content 510 is outputted. In this case, the activated contents may correspond to contents activated in the background of the mobile terminal. Regarding this, it shall be explained in detail with reference to FIGS. 19 and 20.

And, although it is not depicted in the drawing, if a second input signal (not depicted) for selecting a predetermined line of the multi-window region 550 is sensed, the mobile terminal can terminate the multi-window mode. More specifically, if an input for touching a uppermost horizontal line of the multi-window region 550 and dragging the touch in down direction is sensed, the mobile terminal an terminate the multi-window mode.

Figure 6:
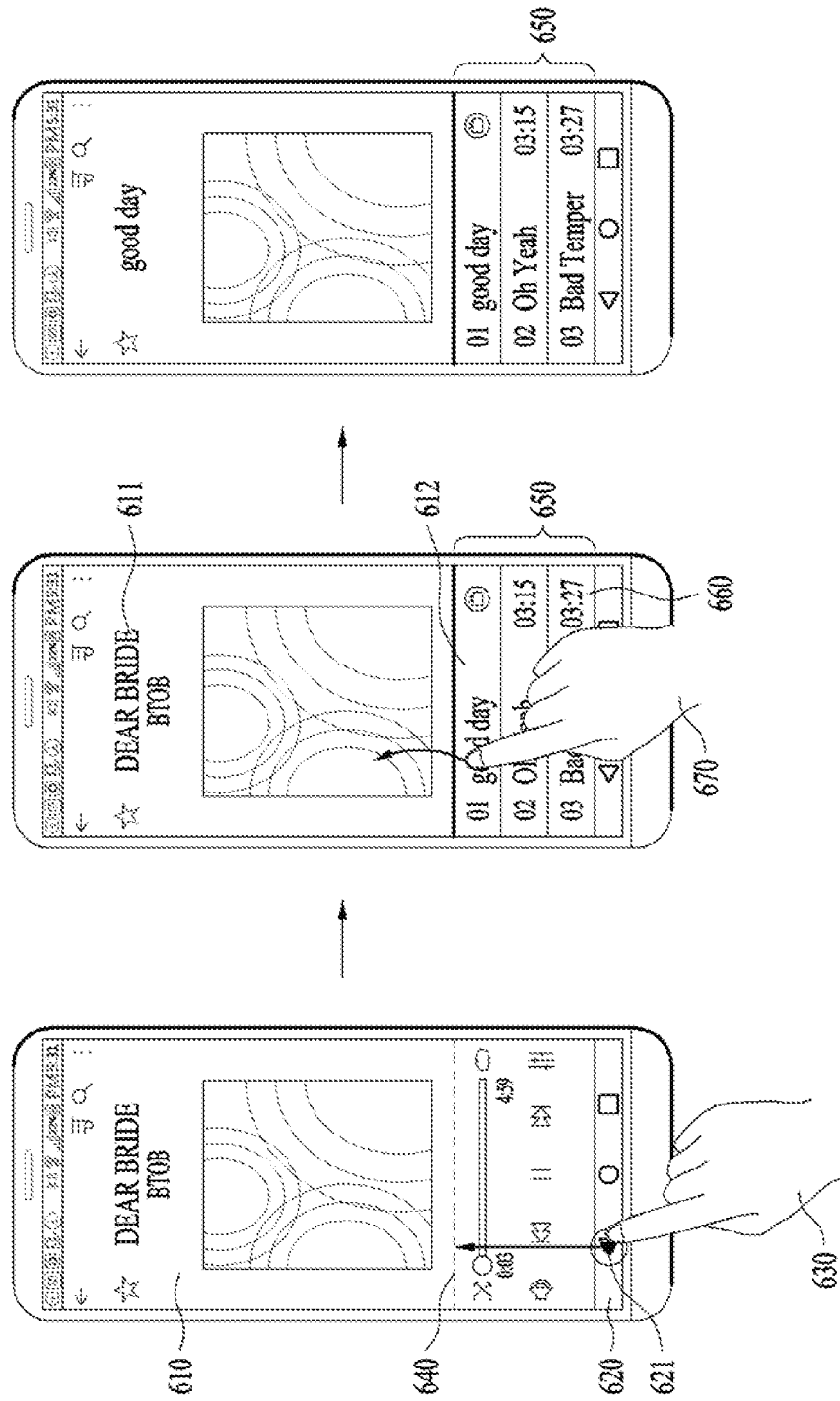
FIG. 6 is a diagram for explaining an embodiment of outputting a previous screen on a multi-window region in a mobile terminal according to one embodiment of the present invention.

FIG. 6 is a diagram for explaining an embodiment of outputting a previous screen on a multi-window region in a mobile terminal according to one embodiment of the present invention. In the embodiment of FIG. 6, explanation on content overlapped with the contents of FIGS. 4 and 5 is omitted.

Referring to the first drawing of FIG. 6, the mobile terminal can output first content 610 and a soft key 620 including a first button 621. In the embodiment of FIG. 6, the first content 610 may correspond to a music application. More specifically, the mobile terminal can output a screen for playing a first music file 611 on the music application as the first content 610.

According to one embodiment of the present invention, the mobile terminal can sense a first input signal 630 for selecting the first button 621. In this case, the first input signal 630 may correspond to an input signal for touching the first button 621 and dragging the touch to a second point 640.

Referring to a second drawing of FIG. 6, the mobile terminal can output a previous screen of the first content 610 on a multi-window region 650 in a state that the first content 610 is outputted according to the first input signal 630. As mentioned in the foregoing example, if the first input signal 630 is sensed in a state that the first music file 611 is playing on the music application, the mobile terminal can output a music playback list 660 of the music application on the multi-window region 650.

More specifically, in order to play the first music file 611, the mobile terminal can output a screen of playing the first music file 611 after the music playback list 660 is outputted first. Hence, the music playback list 660 may correspond to a previous screen of the screen of playing the first music file 611.

According to one embodiment of the present invention, the mobile terminal can sense a second input signal 670 for selecting a first object included in a previous screen of the first content 610. For example, the mobile terminal can sense a second input signal 670 for selecting a second music file 612 included in the music playback list 660 in a state that the music playback list 660 of the music application is outputted as a previous screen of the first content 610.

According to one embodiment of the present invention, the second input signal 670 may correspond to an input signal for touching a first object for predetermined time, dragging the touch, and releasing the touch on the first content 610. For example, a user may be able to touch the second music file 612 outputted on the music playback list 660 and drag the touch to a playback screen of the music application which is outputted at the top of the display unit of the mobile terminal.

Referring to the third drawing of FIG. 6, if the second input signal 670 is sensed, the mobile terminal can perform a function corresponding to the first object on the first content 610. For example, if the second input signal 670 is sensed, the mobile terminal can play the second music file 612 on the playback screen of the music application.

In FIG. 6, although an embodiment of playing a music file on the music application is explained as an example, it is apparent that the present invention can also be applied to an embodiment that a video file is played on a video application.

Figure 7:
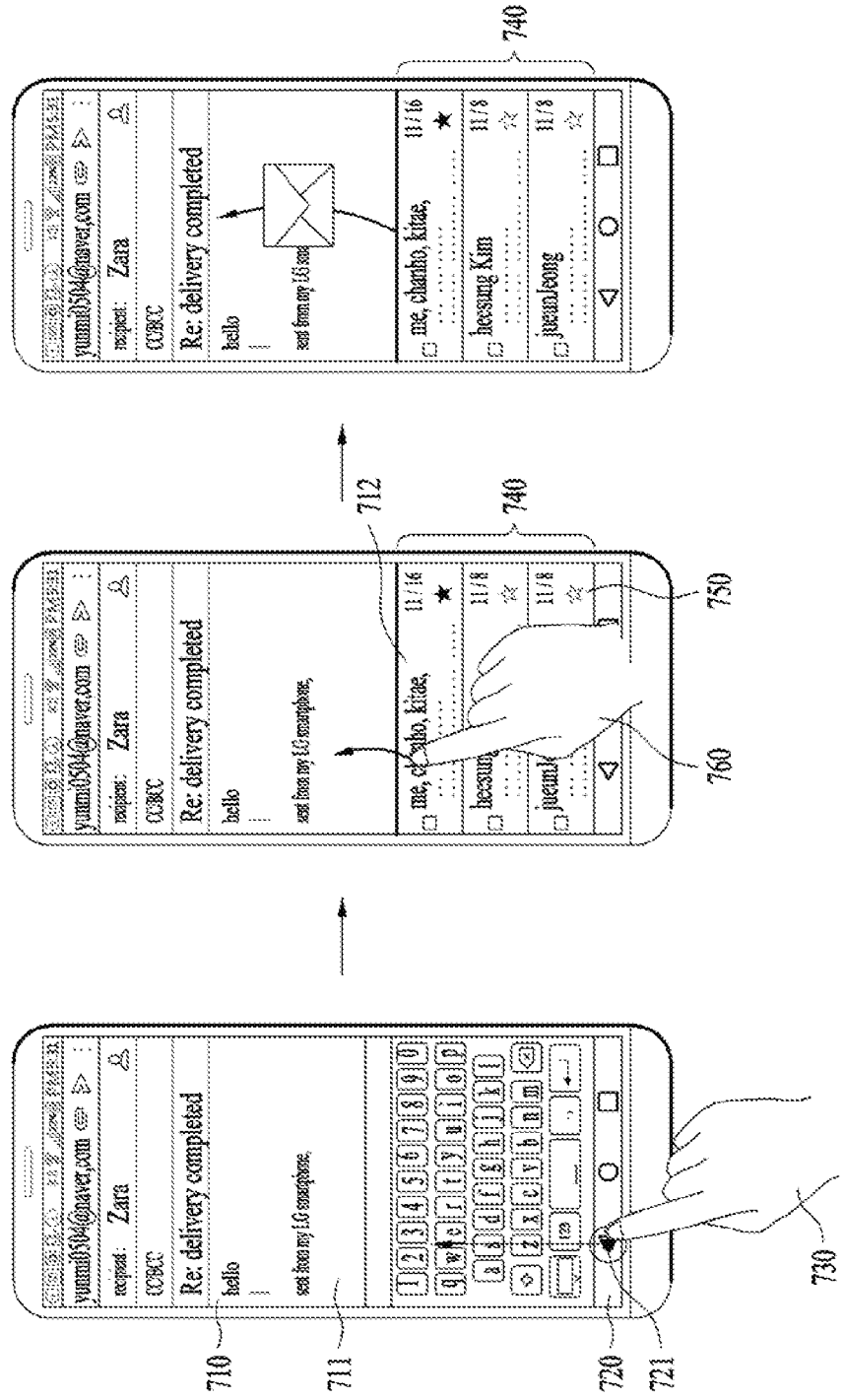
FIG. 7 is a diagram for explaining a different embodiment of outputting a previous screen on a multi-window region in a mobile terminal according to one embodiment of the present invention.

FIG. 7 is a diagram for explaining a different embodiment of outputting a previous screen on a multi-window region in a mobile terminal according to one embodiment of the present invention. In the embodiment of FIG. 7, explanation on content overlapped with the contents of FIGS. 4 to 6 is omitted.

Referring to the first drawing of FIG. 7, the mobile terminal can output first content 710 and a soft key 720 including a first button 721. In the embodiment of FIG. 7, the first content 710 may correspond to a mail application. More specifically, the mobile terminal can output a replay screen in response to a first mail 711 on the mail application as the first content 710.

According to one embodiment of the present invention, the mobile terminal can sense a first input signal 730 for selecting the first button 721 and executing a multi-window mode.

Referring to a second drawing of FIG. 7, the mobile terminal can output a previous screen of the first content 710 on a multi-window region 740 in a state that the first content 710 is outputted according to the first input signal 730. As mentioned in the foregoing example, if the first input signal 730 is sensed in a state that the replay screen is outputted in response to the first mail 711 on the mail application, the mobile terminal can output a mail list 750 of the mail application on the multi-window region 740.

More specifically, in order to make a reply for the first mail 711, the mobile terminal can output the reply screen in response to the first mail 711 after the mail list 750 is outputted first. Hence, the mail list 750 may correspond to a previous screen of the reply screen of the first mail 711.

According to one embodiment of the present invention, the mobile terminal can sense a second input signal 760 for selecting a first object included in a previous screen of the first content 710. For example, the mobile terminal can sense a second input signal 760 for selecting a second mail 712 included in the mail list 750 in a state that the mail list 750 of the mail application is outputted as a previous screen of the first content 710.

According to one embodiment of the present invention, the second input signal 760 may correspond to an input signal for touching a first object for predetermined time, dragging the touch, and releasing the touch on the first content 710. For example, a user may be able to touch the second mail 712 outputted on the mail list 750 and drag the touch to the first mail 711 reply screen of the mail application which is outputted at the top of the display unit of the mobile terminal.

Referring to the third drawing of FIG. 7, if the second input signal 760 is sensed, the mobile terminal can perform a function corresponding to the first object on the first content 710. For example, if the second input signal 760 is sensed, the mobile terminal can attach the second mail 712 on the first mail 711 reply screen of the mail application. In particular, the mobile terminal can perform a function corresponding to the first object on the first content 710. In this case, if an input signal for touching the second mail 712, dragging the touch, and releasing the touch on the mail application is sensed, the mobile terminal can control the second mail 712 to be attached on the mail application.

In FIG. 7, although a mail application is explained as an example, it is apparent that the present invention can also be applied to an instant message application.

Unlike the embodiment of FIG. 6, according to the embodiment of FIG. 7, as the first object is changed to the second mail 712 from the second music file 612, the mobile terminal can perform a function of attaching the second mail 712 on the reply screen of the mail application instead of a function of playing the second music file 612 on the playback screen of the music application.

In particular, the mobile terminal can differently control a function performed on the first content based on the first object outputted on the second content.

Figure 8:
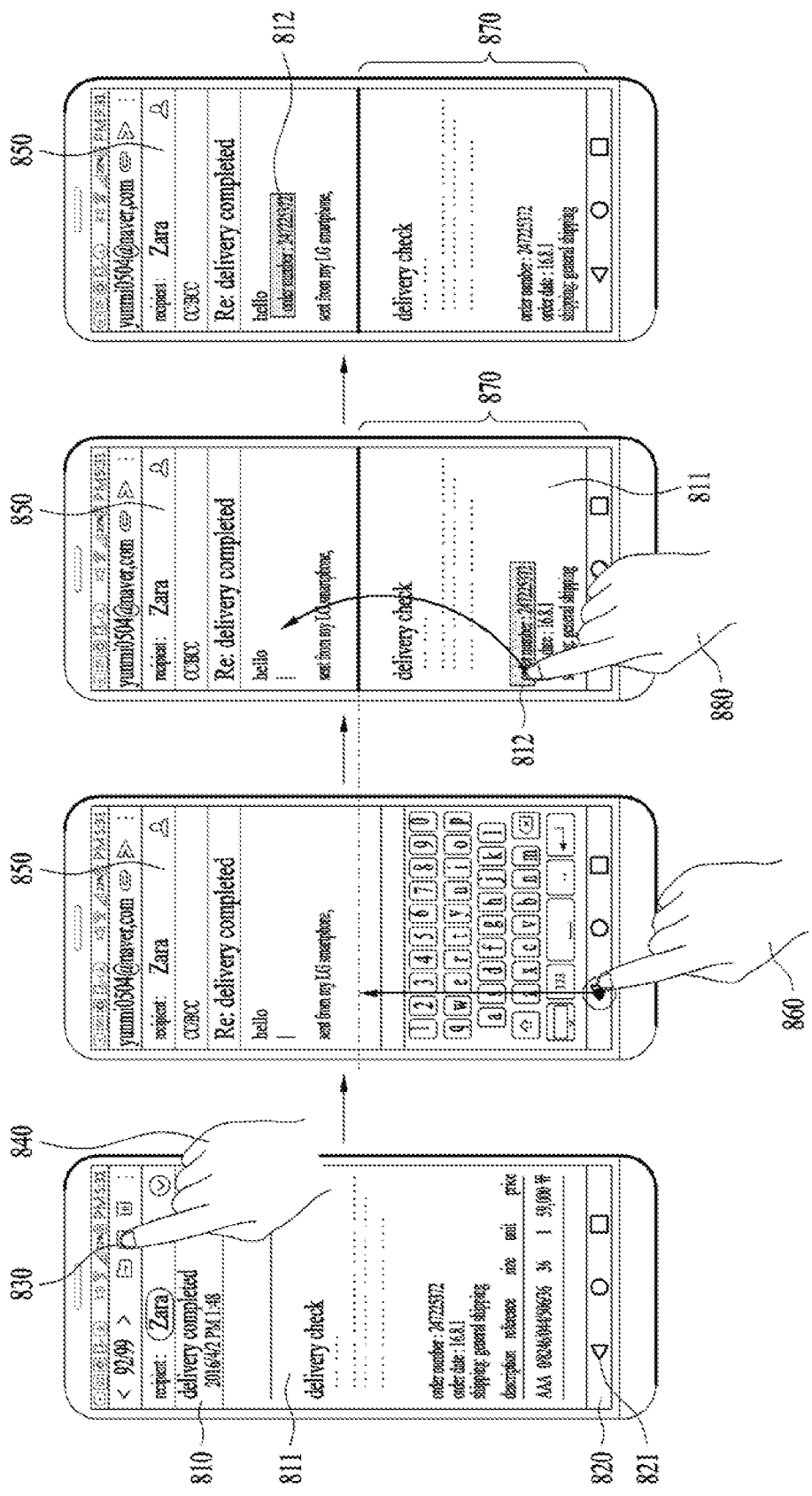
FIG. 8 is a diagram for explaining a further different embodiment of outputting a previous screen on a multi-window region in a mobile terminal according to one embodiment of the present invention.

FIG. 8 is a diagram for explaining a further different embodiment of outputting a previous screen on a multi-window region in a mobile terminal according to one embodiment of the present invention. In the embodiment of FIG. 8, explanation on content overlapped with the contents of FIGS. 4 to 7 is omitted.

In FIG. 8, similar to FIG. 7, a mail application is explained as an example. However, unlike FIG. 7, a screen of a first mail 811 outputted on first content 810 is explained first in a first drawing of FIG. 8. In this case, the screen of the first mail 811 may correspond to a previous screen of a reply screen of the first mail 811.

Referring to the first drawing of FIG. 8, the mobile terminal can output first content 810 and a soft key 820 including a first button 821. More specifically, the mobile terminal can output a first mail 811 on the mail application as the first content 810.

According to one embodiment of the present invention, the mobile terminal can sense a first input signal 840 for selecting a reply icon 830 of the first mail 811. In this case, the reply icon 830 may correspond to an icon for making a response to a sender who has sent the first mail 811. And, the first input signal 840 may correspond to an input signal for touching the reply icon 830 touched by a user.

Referring to a second drawing of FIG. 8, the mobile terminal can output a reply screen in response to the first mail 811 on the mail application as second content 850 according to the first input signal 840. In particular, the second drawing of FIG. 8 may correspond to the first drawing of FIG. 7. Referring to the second drawing of FIG. 8, the mobile terminal selects a first button 821 to sense a second input signal 860 for executing a multi-window mode.

Referring to the third drawing of FIG. 8, the mobile terminal can output the first content 810 on a multi-window region 870 in a state that the second content 850 is outputted according to the second input signal 860. For example, if the second input signal 860 is sensed in a state that a reply screen is outputted in response to the first mail 811 on the mail application, the mobile terminal can output the first mail 811 on the multi-window region 870. This is because an output screen of the first mail 811 corresponds to a previous screen of the reply screen of the first mail 811.

According to one embodiment of the present invention, the mobile terminal can sense a third input signal 880 for selecting a first object 812 included in the first mail 811. For example, the mobile terminal can sense the third input signal 880 for selecting the first object 812 included in the first mail 811 in a state that the first mail is outputted on the multi-window region 870. In this case, the first object 812 may correspond to a text included in the first mail 811. For example, the first object 812 can include an address, a telephone number, an order number, a parcel service number, and the like.

According to one embodiment of the present invention, the third input signal 8800 may correspond to an input signal for touching the first object 812 for predetermined time, dragging the touch, and releasing the touch on the second content 850. For example, a user may be able to touch an order number outputted on the first mail 811 for predetermined time and may be then able to drag the touch to the reply screen of the first mail 811 outputted at the top of the display unit of the mobile terminal.

Referring to the fourth drawing of FIG. 8, if the third input signal 880 is sensed, the mobile terminal can perform a function corresponding to the first object 812 on the second content 850. For example, if the third input signal 880 is sensed, the mobile terminal can copy an order number on the reply screen of the first mail 811 of the mail application.

In FIG. 8, although it is depicted as the order number is copied on the reply screen of the first mail 811 only when the third input signal is sensed, it is apparent that it is also able to copy a text by a different method instead of the third input signal 880 and the text can be pasted on the reply screen of the first mail 811.

In particular, in the embodiment of FIG. 8, unlike the embodiment of FIG. 7, if the first object is changed to a text 812 in the second mail 712, the mobile terminal can perform a function of copying the text 812 instead of a function of attaching the second mail 712 on the reply screen of the mail application.

Figure 9:
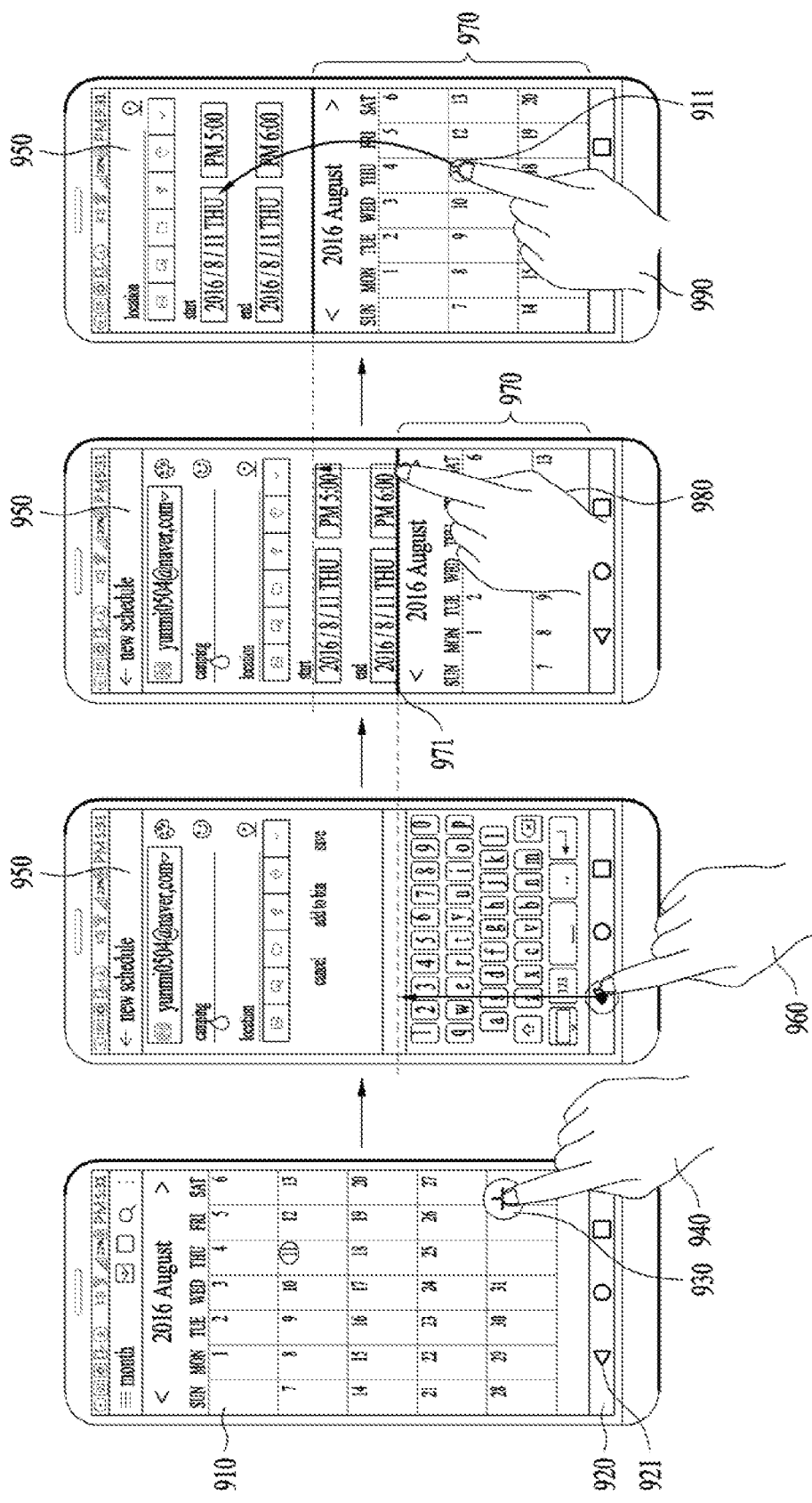
FIG. 9 is a diagram for explaining a further different embodiment of outputting a previous screen on a multi-window region in a mobile terminal according to one embodiment of the present invention.

FIG. 9 is a diagram for explaining a further different embodiment of outputting a previous screen on a multi-window region in a mobile terminal according to one embodiment of the present invention. In the embodiment of FIG. 9, explanation on content overlapped with the contents of FIGS. 4 to 8 is omitted.

Referring to the first drawing of FIG. 9, the mobile terminal can output first content 910 and a soft key 920 including a first button 921. More specifically, the mobile terminal can output a calendar 910 of a calendar application as the first content 910.

According to one embodiment of the present invention, the mobile terminal can sense a first input signal 940 for selecting a schedule addition icon 930. In this case, the schedule addition icon 930 may correspond to an icon for adding a schedule to the currently outputted calendar 910.

Referring to a second drawing of FIG. 9, the mobile terminal can output a schedule addition screen 950 on the calendar application as second content 950 according to the first input signal 940. According to one embodiment of the present invention, the mobile terminal selects the first button 921 in a state that the schedule addition screen 950 is outputted as the second content 950 to sense a second input signal 960 for executing a multi-window mode.

Although it is not related to the main embodiment of the present invention, in the second and third drawings of FIG. 9, if an input signal for simply touching the first button 921 of a keypad outputted on the schedule addition screen 950 is sensed, the mobile terminal can stop outputting the keypad.

Referring to the third drawing of FIG. 9, the mobile terminal can output the first content 910 on a multi-window region 970 in a state that the second content 950 is outputted according to the second input signal 960. For example, if the second input signal 960 is sensed in a state that the schedule addition screen 950 is outputted on the calendar application, the mobile terminal can output the calendar 910 on the multi-window region 970. This is because the calendar 910 corresponds to a previous screen of the schedule addition screen 950.

According to one embodiment of the present invention, the mobile terminal can sense a third input signal 980 for selecting a predetermined line 971 of the multi-window region 970. In this case, the predetermined line 971 may correspond to an uppermost horizontal line of the multi-window region 970.

Referring to the fourth drawing of FIG. 9, if the third input signal 980 is sensed, the mobile terminal can control a size of the multi-window region 970. More specifically, if an input signal for dragging the predetermined line 971 to the up direction is sensed, the mobile terminal can control the size of the multi-window region 970 to be increased to the up direction.

According to one embodiment of the present invention, the mobile terminal can determine an amount of contents outputted on the multi-window region 970 based on the size of the multi-window region 970. More specifically, if the size of the multi-window region 970 is controlled to be big, it may increase the amount of the detail information of the contents outputted on the multi-window region 970.

For example, if the size of the multi-window region 970 is controlled to be big, the mobile terminal can increase the amount of calendar 910 outputted on the multi-window region 970. For example, the mobile terminal outputs the calendar 910 as much as 3 weeks on the multi-window region 970 in the third drawing of FIG. 9, whereas the mobile terminal outputs the calendar 910 as much as 5 weeks on the multi-window region 970 in the fourth drawing of FIG. 9.

Subsequently, the mobile terminal can sense a fourth input signal 990 for selecting a first object 911 included in the calendar 910. For example, the mobile terminal can sense the fourth input signal 990 for selecting the first object 911 included in the calendar 910 in a state that the calendar 910 is outputted on the multi-window region 970. In this case, the first object 911 may correspond to a date (e.g., October 1$^{st}$, etc.) included in the calendar 910.

According to one embodiment of the present invention, if the fourth input signal 990 is sensed, the mobile terminal can perform a function corresponding to the first object 911 on the second content 950. For example, if the fourth input signal 990 is sensed, the mobile terminal can add a selected date to the schedule addition screen 950.

Figure 10:
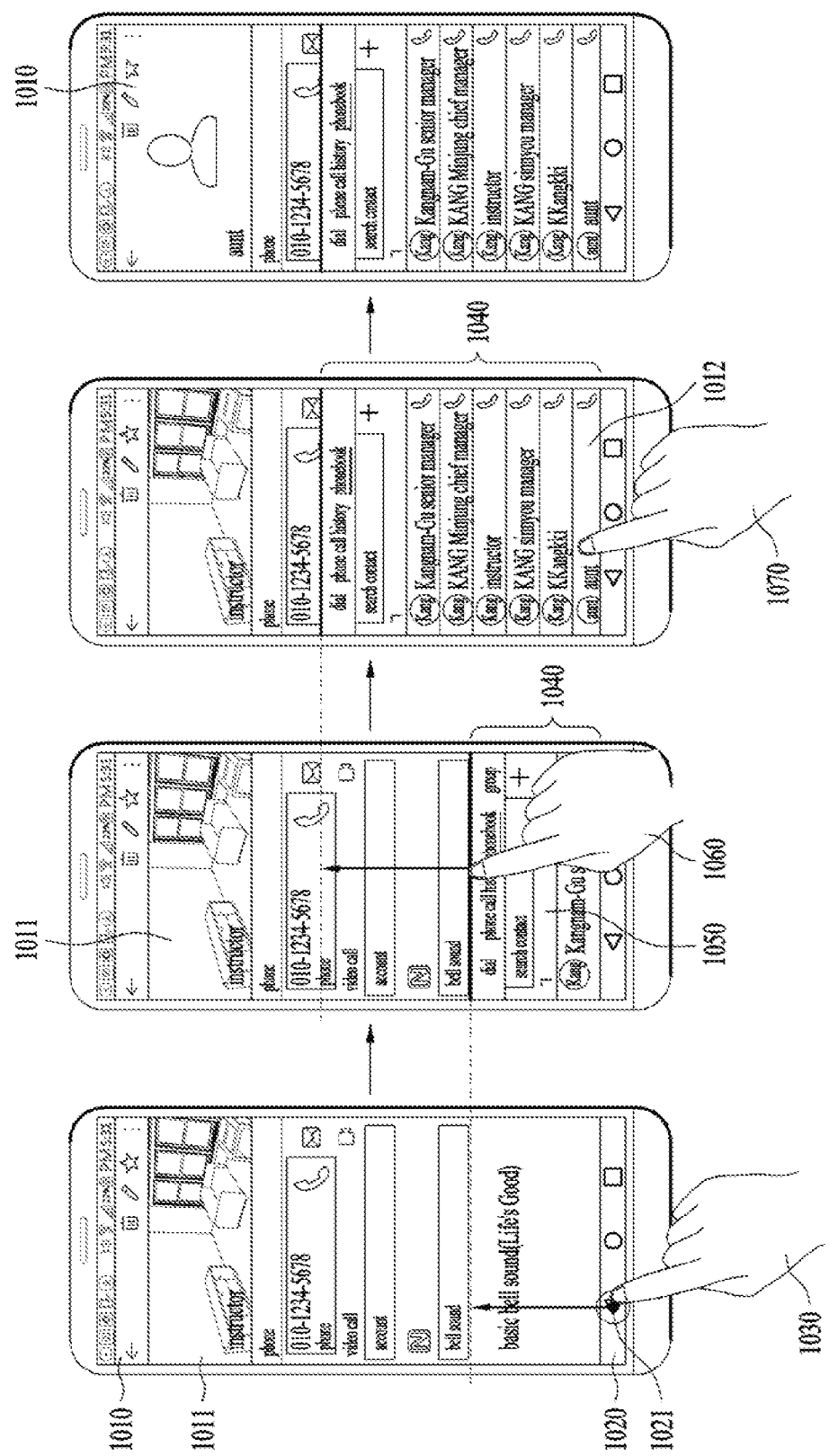
FIG. 10 is a diagram for explaining a further different embodiment of outputting a previous screen on a multi-window region in a mobile terminal according to one embodiment of the present invention.

FIG. 10 is a diagram for explaining a further different embodiment of outputting a previous screen on a multi-window region in a mobile terminal according to one embodiment of the present invention. In the embodiment of FIG. 10, explanation on content overlapped with the contents of FIGS. 4 to 9 is omitted.

Referring to the first drawing of FIG. 10, the mobile terminal can output first content 1010 and a soft key 1020 including a first button 1021. More specifically, the mobile terminal can output detail information 1011 of a first contact of a contact application as the first content 1010.

According to one embodiment of the present invention, the mobile terminal can sense a first input signal 1030 for executing a multi-window mode by selecting a first button 1021 in a state that detail information 1011 of a first contact is outputted.

Referring to a second drawing of FIG. 10, the mobile terminal can output second content 1050 on a multi-window region 1040 in a state that the detail information 1011 of the first contact is outputted according to the first input signal 1030. For example, if the first input signal 1030 is sensed in the state that the detail information of the first contact is outputted in the contact application, the mobile terminal can output a list of contacts 1050 on the multi-window region 1040. This is because the list of contacts 1050 corresponds to a previous screen of the detail information 1011 of the first contact.

According to one embodiment of the present invention, the mobile terminal can sense a second input signal 1060 that selects a predetermined line of the multi-window region 1040.

Referring to a third drawing of FIG. 10, if the second input signal 1060 is sensed, the mobile terminal can control a size of the multi-window region 1040. According to one embodiment of the present invention, the mobile terminal can determine an amount of contents outputted on the multi-window region 1040 based on the size of the multi-window region 1040.

For example, if the size of the multi-window region 1040 is controlled to be big, the mobile terminal can increase the amount of the list of contacts 1050 outputted on the multi-window region 1040. For example, the mobile terminal outputs one contact on the multi-window region 1040 in the second drawing of FIG. 10, whereas the mobile terminal can output 6 contacts on the multi-window region 1040 in the third drawing of FIG. 10.

According to one embodiment of the present invention, if an input signal (not depicted) for scrolling the multi-window region 1040 is sensed, the mobile terminal can scroll the list of contacts 1050 outputted on the multi-window region 1050.

Subsequently, the mobile terminal can sense a third input signal 1070 that selects a first object 1012 included in the second content 1050. For example, the mobile terminal can sense the third input signal 1070 for selecting a second contact 1012 included in the list of contacts 1050 in a state that the list of contacts 1050 is outputted on the multi-window region 1040.

Referring to the fourth drawing of FIG. 10, if the third input signal 1070 is sensed, the mobile terminal can perform a function corresponding to the first object 1012 on the first content 1010. For example, if the third input signal 1030 is sensed, the mobile terminal can output detail information of the second contact 1012 on the contact application corresponding to the first content 1010.

In particular, unlike the embodiments of FIGS. 6 to 9, the third input signal 1070 of FIG. 10 may correspond to an input signal for simply touching the first object 1012. If the third input signal 1070 corresponds to an input signal for simply touching the first object 1012 rather than an input signal for touching the first object 1012 for predetermined time, dragging the touch, and releasing the touch on the first content 1010, the mobile terminal can output information corresponding to the first object 1012 without attaching or copying the first object 1012 to the first content 1010.

Figure 11:
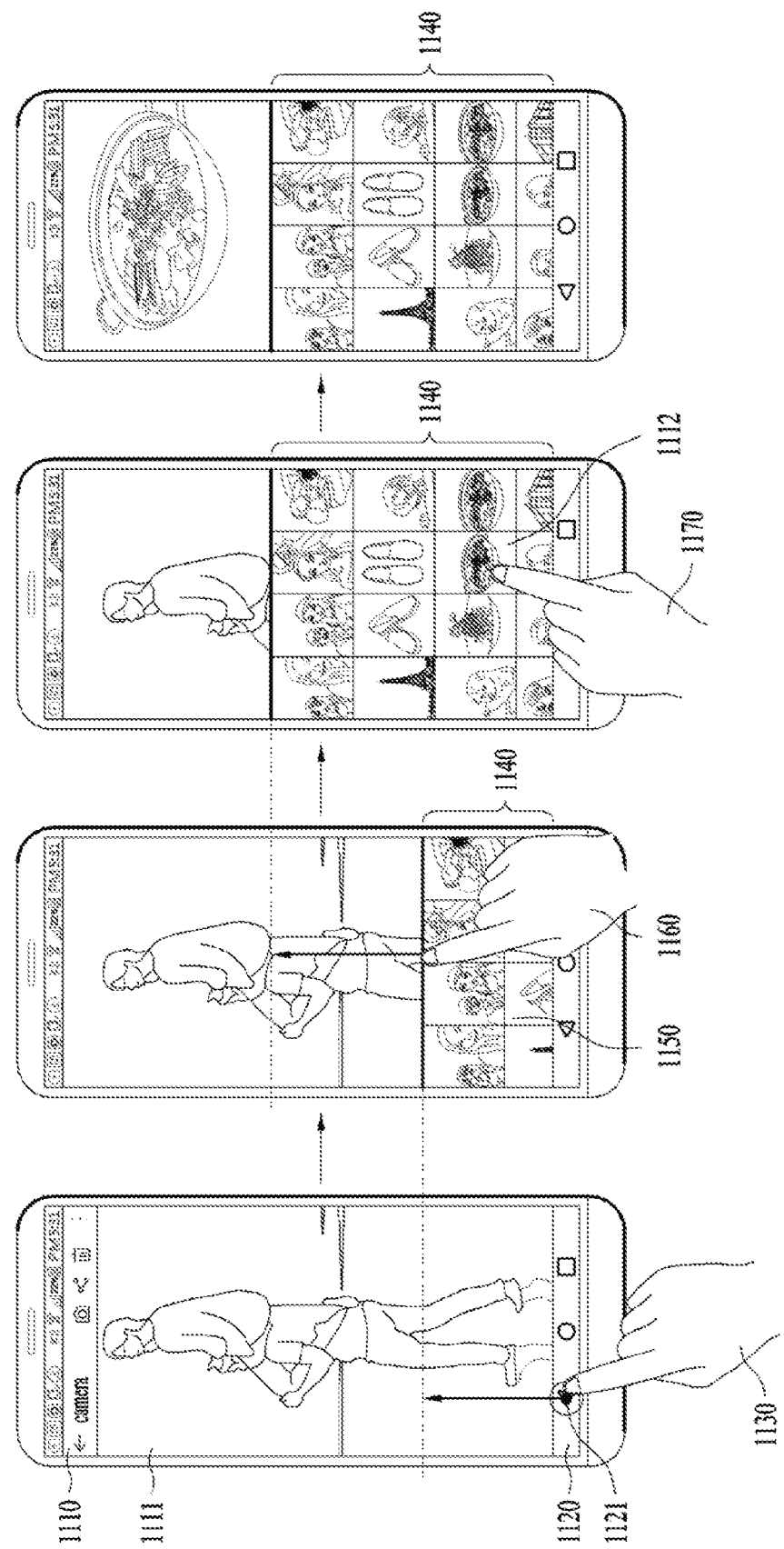
FIG. 11 is a diagram for explaining a further different embodiment of outputting a previous screen on a multi-window region in a mobile terminal according to one embodiment of the present invention.

FIG. 11 is a diagram for explaining a further different embodiment of outputting a previous screen on a multi-window region in a mobile terminal according to one embodiment of the present invention. In the embodiment of FIG. 11, explanation on content overlapped with the contents of FIGS. 4 to 10 is omitted.

Referring to the first drawing of FIG. 11, the mobile terminal can output first content 1110 and a soft key 1120 including a first button 1121. More specifically, the mobile terminal can output a first image 1111 of a gallery application in full screen as the first content 1110.

In this case, the full screen corresponds to a state that an entire image is displayed on a single screen. The full screen corresponds to a state that at least one orientation among horizontal and vertical orientations of the image is adjusted to make the image fill the screen. In general, if a thumbnail is selected in a thumbnail view state that thumbnails corresponding to images are displayed in the gallery application, an image corresponding to the selected thumbnail can be displayed in full screen.

According to one embodiment of the present invention, the mobile terminal can sense a first input signal 1130 for executing a multi-window mode by selecting a first button 1121 in a state that the first image 1111 is outputted.

Referring to a second drawing of FIG. 11, the mobile terminal can output second content 1150 on a multi-window region 1140 in a state that the first image 1111 is outputted according to the first input signal 1130. For example, if the first input signal 1130 is sensed in the state that the first image 1111 is outputted in the gallery application, the mobile terminal can output a list of images 1150 on the multi-window region 1140. This is because the list of images 1150 corresponds to a previous screen of the first image 1111.

According to one embodiment of the present invention, the mobile terminal can sense a second input signal 1160 that selects a predetermined line of the multi-window region 1140.

Referring to a third drawing of FIG. 11, if the second input signal 1160 is sensed, the mobile terminal can control a size of the multi-window region 1140. According to one embodiment of the present invention, the mobile terminal can determine an amount of contents outputted on the multi-window region 1140 based on the size of the multi-window region 1140.

For example, if the size of the multi-window region 1140 is controlled to be big, the mobile terminal can increase the amount of the list of images 1150 outputted on the multi-window region 1140.

Subsequently, the mobile terminal can sense a third input signal 1170 that selects a first object 1112 included in the second content 1150. For example, the mobile terminal can sense the third input signal 1170 for selecting a second image 1112 included in the list of images 1150 in a state that the list of images 1150 is outputted on the multi-window region 1140.

Referring to the fourth drawing of FIG. 11, if the third input signal 1170 is sensed, the mobile terminal can perform a function corresponding to the first object 1112 on the first content 1110. For example, if the third input signal 1130 is sensed, the mobile terminal can output the second image 1112 on the gallery application corresponding to the first content 1110.

Figure 12:
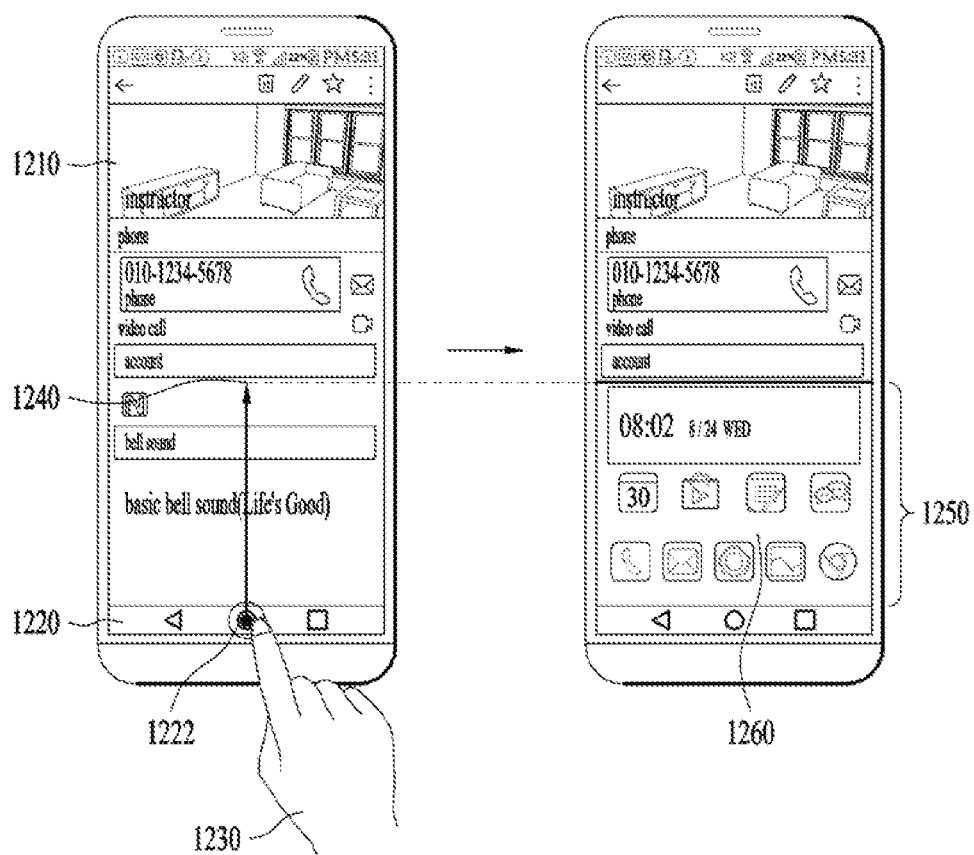
FIG. 12 is a diagram for explaining an embodiment of outputting a home screen on a multi-window region in a mobile terminal according to one embodiment of the present invention.

FIG. 12 is a diagram for explaining an embodiment of outputting a home screen on a multi-window region in a mobile terminal according to one embodiment of the present invention. In the embodiment of FIG. 12, explanation on content overlapped with the contents of FIGS. 4 to 11 is omitted.

Referring to the first drawing of FIG. 12, the mobile terminal can output first content 1210 and a soft key 1220 including a second button 1222. According to one embodiment of the present invention, the first content 1210 can include all applications. In the embodiment of FIG. 12, assume that the first content 1210 corresponds to a contact application.

According to one embodiment of the present invention, the mobile terminal can sense a first input signal 1230 that selects the second button 1222. In this case, the first input signal 1230 may correspond to an input signal for touching the first button 1222 and dragging the touch to a second point 1240. In this case, the contact application is just an example only. The mobile terminal can sense the first input signal 1230 in a state that a random application is outputted on the display unit.

Referring to a second drawing of FIG. 12, if the first input signal 1230 is sensed, the mobile terminal can output a home screen 1260 on a multi-window region 1250 in a state that the first content 1210 is outputted. More specifically, the mobile terminal can output a reduced screen of the home screen 1260 on the multi-window region 1250 in the state that the first content 1210 is outputted.

In general, the mobile terminal can output the home screen 1260 in full screen on the display unit. In this case, the home screen 1260 can include at least one icon and a widget for executing applications and an empty space except the at least one icon and the widget. In particular, as shown in the embodiment of FIG. 12, in order to output the home screen 1260 on the multi-window region 1250, it is necessary to reduce a size of the home screen 1260.

In the following embodiments of FIGS. 12 to 18, explanation on an embodiment of controlling a size of the multi-window region 1250 according to a sensed input signal (not depicted) for selecting the multi-window region 1250 is omitted. However, according to the embodiments of FIGS. 12 to 18, the mobile can determine an amount of a home screen outputted on the multi-window region 1250 based on a size of the multi-window region 1250.

According to one embodiment of the present invention, as the size of the multi-window region 1250 increases, the mobile terminal can output a wider empty space of the home screen 1260 outputted on the multi-window region 1250. If a height of the multi-window region 1250 is lower than a height of a predetermined icon, it may be able to output an icon outputted on the home screen 1260 in a manner of reducing a size of the icon. In particular, it may be able to apply the embodiments of FIGS. 9 to 11 to the embodiments of FIGS. 12 to 18.

Figure 13:
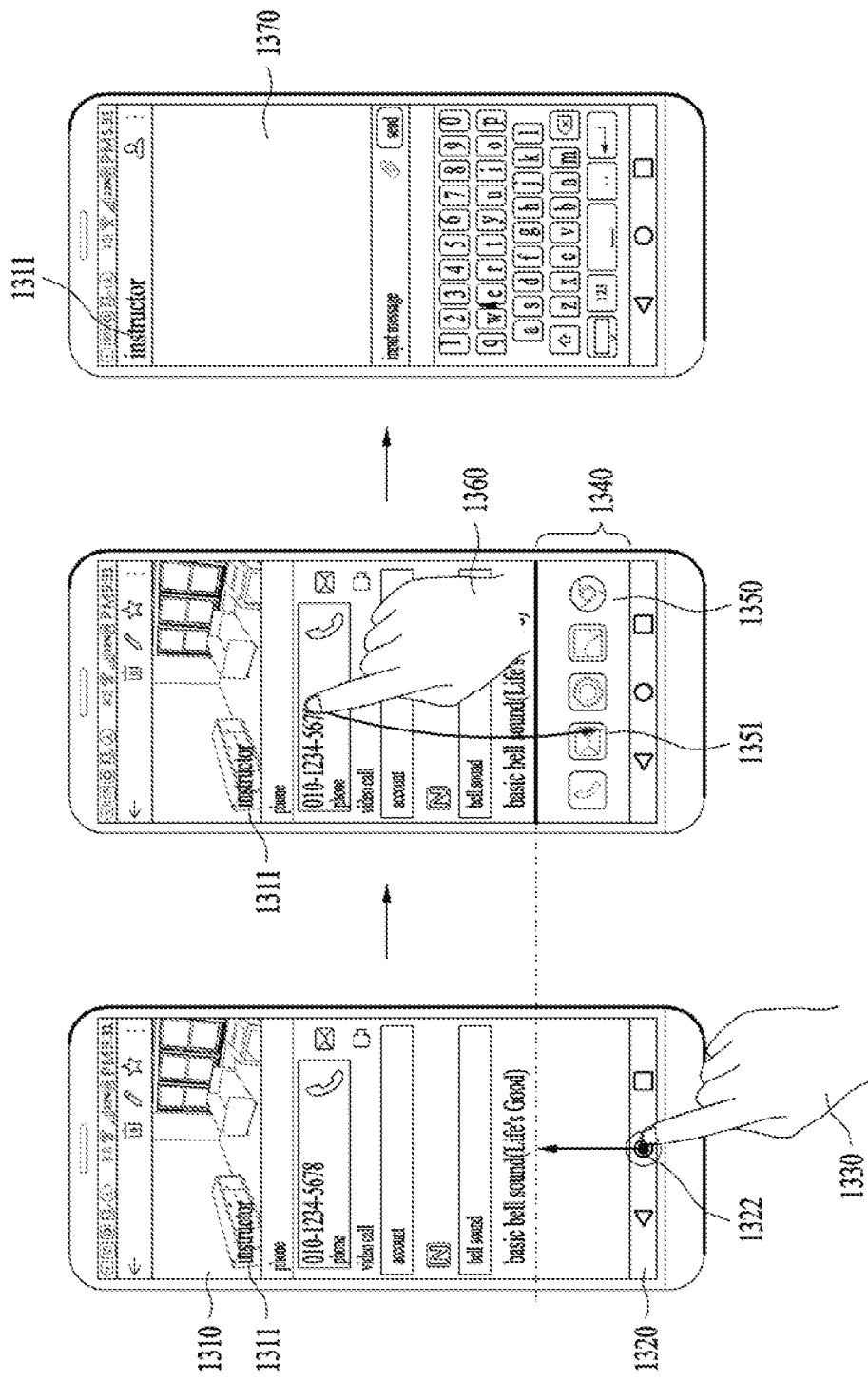
FIG. 13 is a diagram for explaining a different embodiment of outputting a home screen on a multi-window region in a mobile terminal according to one embodiment of the present invention.

FIG. 13 is a diagram for explaining an embodiment of outputting a home screen on a multi-window region in a mobile terminal according to a different embodiment of the present invention. In the embodiment of FIG. 13, explanation on content overlapped with the contents of FIGS. 4 to 12 is omitted.

Referring to the first drawing of FIG. 13, the mobile terminal can output first content 1310 including a first object 1311 and a soft key 1320 including a second button 1322. More specifically, the mobile terminal can output detail information 1311 of a first contact on a contact application as the first object 1311.

According to one embodiment of the present invention, the mobile terminal can sense a first input signal 1330 that executes a multi-window mode by selecting the second button 1322.

Referring to a second drawing of FIG. 13, if the first input signal 1330 is sensed, the mobile terminal can output a home screen 1360 including at least one icon on a multi-window region 1340 in a state that the first content 1310 is outputted. For example, if the first input signal 1330 is sensed in a state that detail information 1311 of a first contact is outputted, the mobile terminal can output the home screen 1350 on the multi-window region 1340 in a manner of reducing a size of the home screen. In this case, the home screen 1350 can include a first icon 1351.

According to one embodiment of the present invention, the mobile terminal can sense a second input signal 1360 that selects a first object 1311 outputted on the first content 1310. In this case, the second input single 1360 may correspond to a touch input signal for touching the first object 1311 for predetermined time and dragging the touch to a location at which the first icon 1351 is outputted.

For example, a user may touch detail information 1311 (e.g., telephone number) of a first contact outputted on the contact application 1310 for predetermined time and may be then able to drag the touch to the first icon 1351 outputted on the multi-window region 1340. And, for example, the first icon 1351 may correspond to an icon for executing a message application.

Referring to the third drawing of FIG. 13, if a second input signal 1360 is sensed, the mobile terminal terminates a multi-window mode and may be then able to execute third content 1370 corresponding to the first icon 1351 on the display unit. For example, when the first icon 1551 corresponds to an icon for executing a message application, if the second input signal 1360 is sensed, the mobile terminal can execute the message application 1370 on the display unit in full screen.

According to one embodiment of the present invention, when the mobile terminal executes the third content 1370, the mobile terminal can execute the third content by including information on a first object 1311 included in the first content 1310. For example, when the mobile terminal executes the message application 1370 in full screen, the mobile terminal can execute the message application by including information on detail information 1311 of the first contact included in the contact application 1310. More specifically, when the message application 1370 is executed, the mobile terminal can configure a recipient with a telephone number of the first contact.

Although it is not depicted, the second input signal 1360 can be sensed in an opposite way. In particular, the mobile terminal can sense the second input signal 1360 for selecting the first icon 1351 included in the home screen 1350. In this case, the second input signal 1360 may correspond to an input signal for touching the first icon 1351 for predetermined time, dragging the touch, and releasing the touch on the first content 1310.

Figure 14:
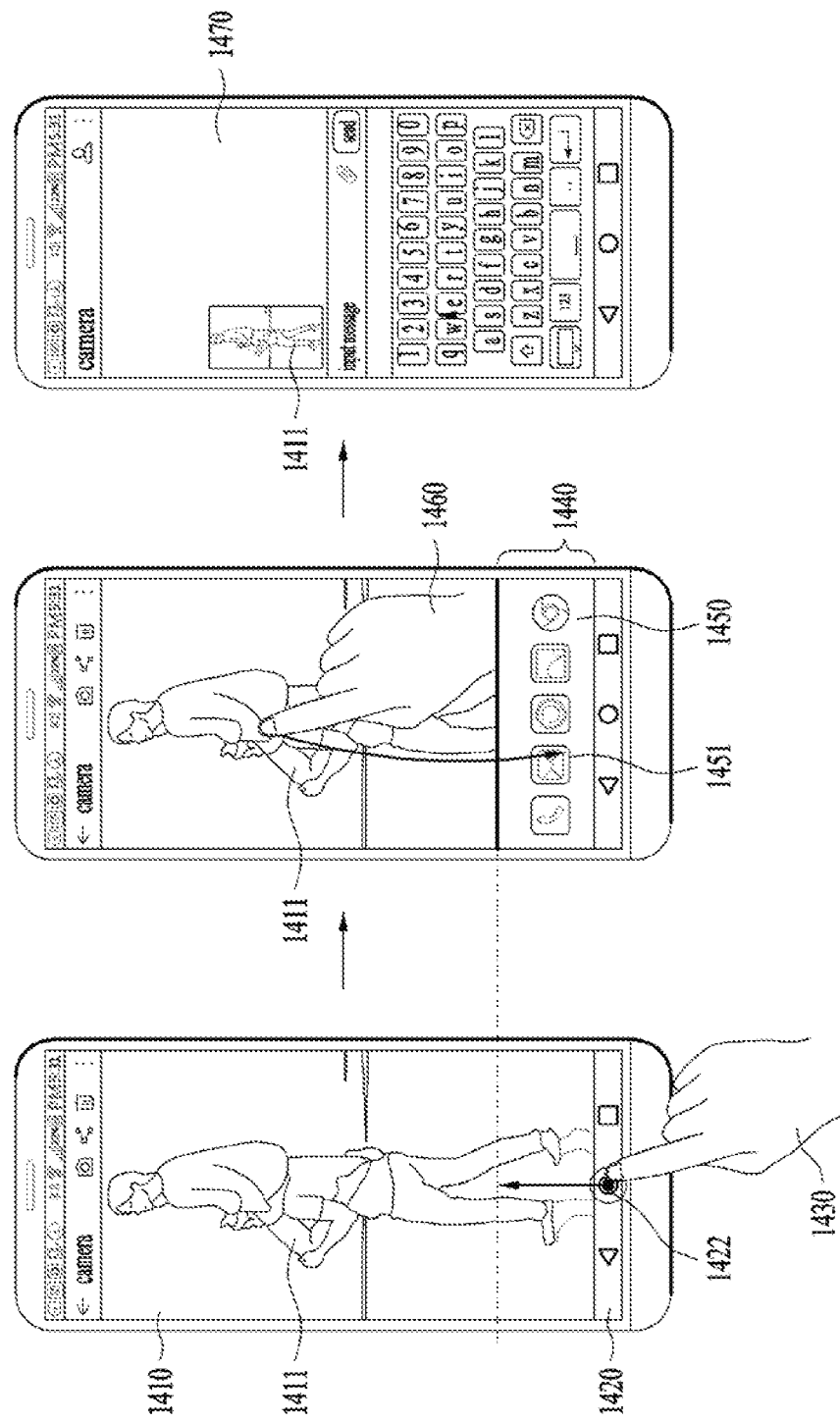
FIG. 14 is a diagram for explaining a further different embodiment of outputting a home screen on a multi-window region in a mobile terminal according to one embodiment of the present invention.

FIG. 14 is a diagram for explaining an embodiment of outputting a home screen on a multi-window region in a mobile terminal according to a different embodiment of the present invention. In the embodiment of FIG. 14, explanation on content overlapped with the contents of FIGS. 4 to 13 is omitted.

Referring to the first drawing of FIG. 14, the mobile terminal can output first content 1410 including a first object 1411 and a soft key 1420 including a second button 1422. More specifically, the mobile terminal can output a first image 1411 in full screen on a gallery application.

According to one embodiment of the present invention, the mobile terminal can sense a first input signal 1430 that executes a multi-window mode by selecting the second button 1422.

Referring to a second drawing of FIG. 14, if the first input signal 1430 is sensed in a state that the first image 1411 is outputted, the mobile terminal can output a home screen 1450 including at least one icon on a multi-window region 1440 in a manner of reducing a size of the home screen 1450. In this case, the home screen can include a first icon 1451.

According to one embodiment of the present invention, the mobile terminal can sense a second input signal 1460 that selects a first object 1411 outputted on the first content 1410. For example, a user may touch the first image 1411 outputted on the gallery application 1410 for predetermined time and may be then able to drag the touch to the first icon 1451 outputted on the multi-window region 1440. And, for example, the first icon 1451 may correspond to an icon for executing a message application.

Referring to the third drawing of FIG. 14, when the first icon 1451 corresponds to an icon for executing the message application, if the second input signal 1460 is sensed, the mobile terminal terminates a multi-window mode and can execute the message application 1470 corresponding to the first icon 1451 in full screen on the display unit.

According to one embodiment of the present invention, when the mobile terminal executes third content 1470, the mobile terminal can execute the third content by including information on a first object 1411 included in the first content 1410. For example, when the mobile terminal executes the message application 1470 in full screen, the mobile terminal can execute the message application by including information on the first image 1411. More specifically, when the message application 1470 is executed, the mobile terminal can attach the first image 1411 to a message.

In particular, unlike the embodiment of FIG. 13, according to the embodiment of FIG. 14, if the first object is changed to the first image instead of the detail information 1311 of the first contact, the mobile terminal can perform a function of attaching the first image 1411 instead of a function of configuring a recipient with the first contact on the message application.

Although it is not depicted, it is apparent that it is able to apply the embodiment of FIG. 14 to the embodiment of FIG. 13. For example, the mobile terminal can attach detail information 1311 of the first contact to a message on the message application without a function that a recipient is configured by the first contact.

Figure 15:
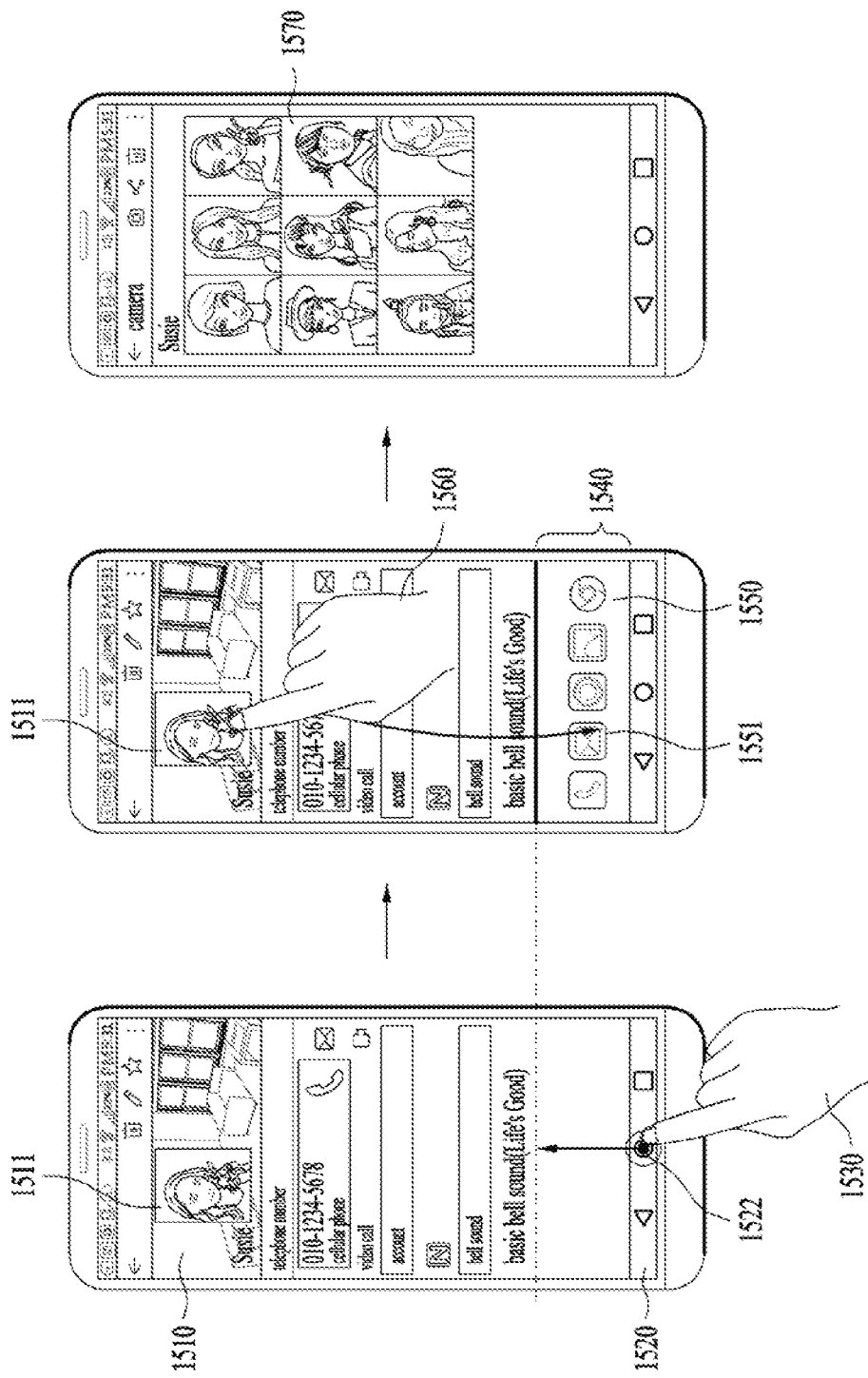
FIG. 15 is a diagram for explaining a further embodiment of outputting a home screen on a multi-window region in a mobile terminal according to one embodiment of the present invention.

FIG. 15 is a diagram for explaining an embodiment of outputting a home screen on a multi-window region in a mobile terminal according to a different embodiment of the present invention. In the embodiment of FIG. 15, explanation on content overlapped with the contents of FIGS. 4 to 14 is omitted.

Referring to the first drawing of FIG. 15, the mobile terminal can output first content 1510 including a first object 1511 and a soft key 1520 including a second button 1522.

More specifically, the mobile terminal can output an image 1511 of a first contact on a contact application as the first object 1511. In this case, the image 1511 of the first contact can include identification information. For example, it may store a name of the first contact, a telephone number of the first contact, e-mail address of the first contact, and the like in the image 1511 of the first contact as identification information. The mobile terminal can store the identification information in the image 1511 of the first contact in a form of hash tag (#).

According to one embodiment of the present invention, the mobile terminal can sense a first input signal 1530 that executes a multi-window mode by selecting the second button 1522.

Referring to a second drawing of FIG. 15, if the first input signal 1530 is sensed in a state that the image 1511 of the first contact is outputted, the mobile terminal can output a home screen 1550 including at least one icon on a multi-window region 1540 in a manner of reducing a size of the home screen. In this case, the home screen 1550 can include a first icon 1551. In this case, the first icon 1551 may correspond to an icon for executing a gallery application. The gallery application may correspond to an application outputting at least one or more images.

According to one embodiment of the present invention, the mobile terminal can sense a second input signal 1560 for touching the image 1511 of the first contact for predetermined time and dragging the touch to the first icon 1551 outputted on the multi-window region 1540.

Referring to the third drawing of FIG. 15, when the first icon 1551 corresponds to an icon for executing the gallery application, if the second input signal 1560 is sensed, the mobile terminal terminates the multi-window mode and can execute the gallery application 1570 corresponding to the first icon 1551 in full screen on the display unit.

According to one embodiment of the present invention, when the mobile terminal executes third content 1570, the mobile terminal can execute the third content by including information on a first object 1511 included in the first content 1510. For example, when the mobile terminal executes the gallery application 1570 in full screen, the mobile terminal can execute the gallery application by including information on the image 1511 of the first contact.

More specifically, when the gallery application 1570 is executed, the mobile terminal can output at least one image having identification information identical to the image 1511 of the first contact. For example, if the image 1511 of the first contact has such identification information as 'Susie', the mobile terminal can output at least one image having identification information (e.g., Susie) identical to the image 1511 of the first contact among at least one or more images included in the gallery application 1570.

Figure 16:
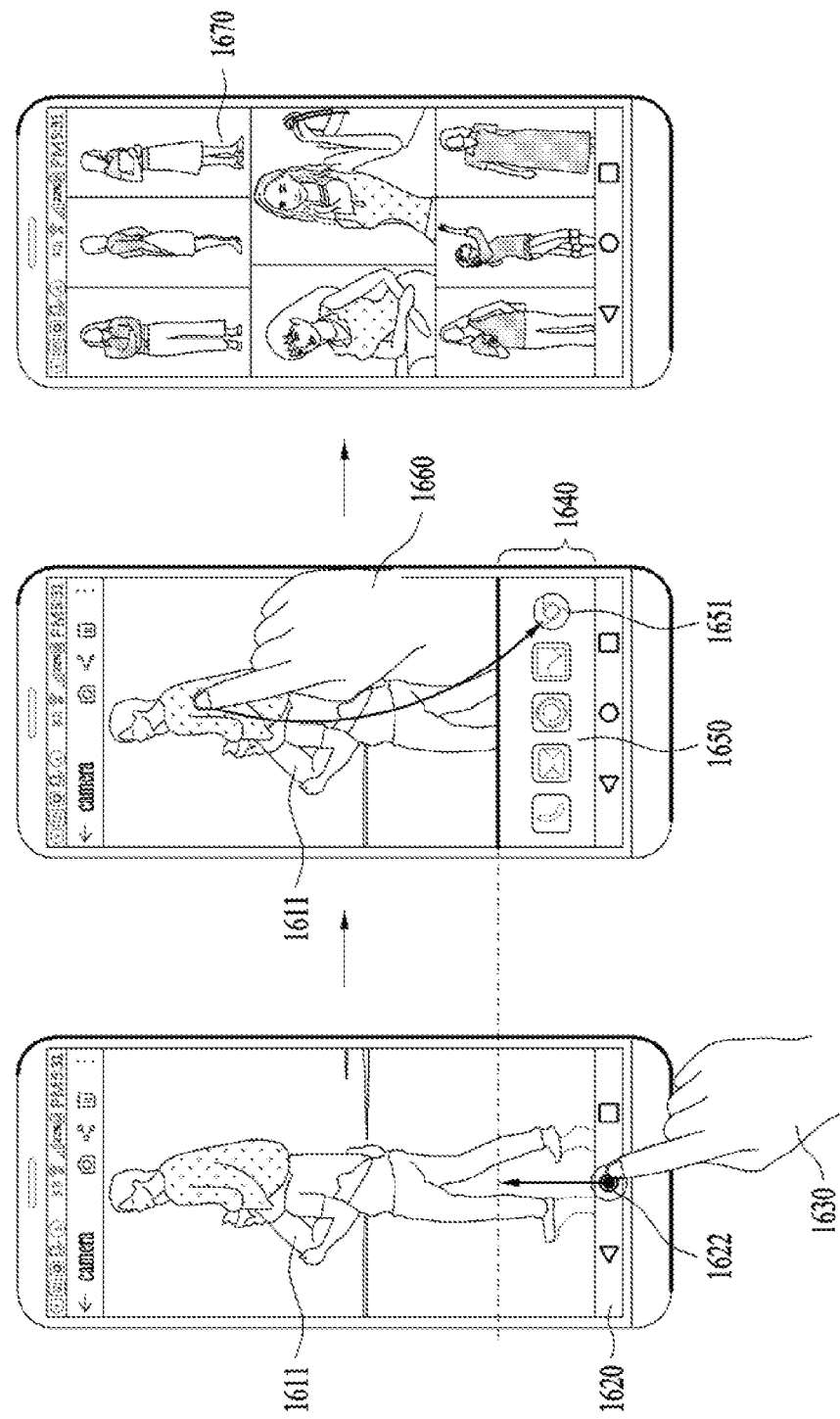
FIG. 16 is a diagram for explaining a further embodiment of outputting a home screen on a multi-window region in a mobile terminal according to one embodiment of the present invention.

FIG. 16 is a diagram for explaining an embodiment of outputting a home screen on a multi-window region in a mobile terminal according to a different embodiment of the present invention. In the embodiment of FIG. 16, explanation on content overlapped with the contents of FIGS. 4 to 15 is omitted.

Referring to the first drawing of FIG. 16, the mobile terminal can output a first image 1611 and a soft key 1620 including a second button 1622. More specifically, the mobile terminal can output the first image 1611 on a gallery application. According to one embodiment of the present invention, the mobile terminal can sense a first input signal 1630 that executes a multi-window mode by selecting the second button 1622.

Referring to a second drawing of FIG. 16, if the first input signal 1630 is sensed in a state that the first image 1611 is outputted, the mobile terminal can output a home screen 1650 including a first icon 1651 on a multi-window region 1640 in a manner of reducing a size of the home screen. In this case, the first icon 1651 may correspond to an icon for executing a web browser.

In this case, the web browser may correspond to an application including an image search function. More specifically, a recently provided web browser provides an image-based search engine instead of a character-based search engine. Hence, the mobile terminal can provide a web browser configured to search a web on the basis of an inputted image.

According to one embodiment of the present invention, the mobile terminal can sense a second input signal 1660 for touching the first image 1611 for predetermined time and dragging the touch to the first icon 1651 outputted on the multi-window region 1640.

Referring to the third drawing of FIG. 16, when the first icon 1651 corresponds to an icon for executing the web browser 1670, if the second input signal 1660 is sensed, the mobile terminal terminates the multi-window mode and can execute the web browser 1670 in full screen on the display unit.

According to one embodiment of the present invention, when the mobile terminal executes third content 1670, the mobile terminal can execute the third content by including information on the first image 1611. For example, when the mobile terminal executes the web browser 1670 in full screen, the mobile terminal can output an image search result for the first image 1611 on the web browser 1670.

Figure 17:
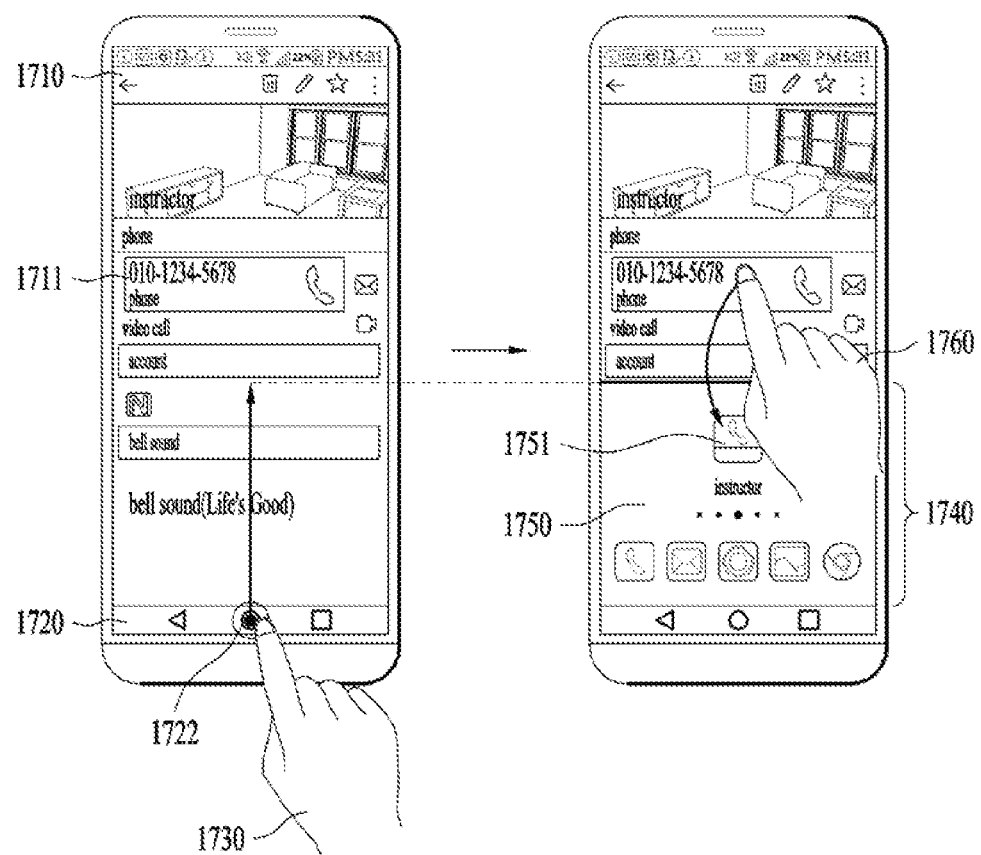
FIG. 17 is a diagram for explaining a further different embodiment of outputting a home screen on a multi-window region in a mobile terminal according to one embodiment of the present invention.

FIG. 17 is a diagram for explaining an embodiment of outputting a home screen on a multi-window region in a mobile terminal according to a different embodiment of the present invention. In the embodiment of FIG. 17, explanation on content overlapped with the contents of FIGS. 4 to 16 is omitted.

Referring to the first drawing of FIG. 17, the mobile terminal can output first content 1710 and a soft key 1720 including a second button 1722. More specifically, the mobile terminal can output detail information 1711 of a first contact on a contact application. According to one embodiment of the present invention, the mobile terminal can sense a first input signal 1730 that executes a multi-window mode by selecting the second button 1722.

Referring to a second drawing of FIG. 17, if the first input signal 1730 is sensed in a state that the detail information 1711 of the first contact is outputted, the mobile terminal can output a home screen 1750 including at least one icon on a multi-window region 1740 in a manner of reducing a size of the home screen.

In the embodiment of FIG. 17, if the first input signal 1730 is sensed, the mobile terminal can configure the multi-window region 1740 bigger than the multi-window region mentioned earlier in the embodiments of FIGS. 13 to 16. For example, a user can drag the second button 1722 to a higher position compared to the embodiments of FIGS. 13 to 16 via the first input signal 1730.

In this case, the mobile terminal can output a home screen 1750 including more empty space except at least one icon on the multi-window region 1740. In particular, if a height of the multi-window region 1740 is configured to be higher than a height of an icon, the home screen 1750 may have more empty space.

According to one embodiment of the present invention, the mobile terminal can sense a second input signal 1760 for touching the detail information 1711 of the first contact for predetermined time and dragging the touch to an empty space outputted on the multi-window region 1740.

According to one embodiment of the present invention, if the second input signal 1760 is sensed, the mobile terminal can output an icon 1751 corresponding to the detail information 1711 of the first contact. For example, the mobile terminal can output a shortcut icon 1751 of the detail information 1711 of the first contact on an empty space of the home screen 1750 according to the second input signal 1760.

According to one embodiment of the present invention, when the icon 1751 corresponding to the detail information 1711 of the first contact is outputted on the home screen 1750, if an input signal (not depicted) for selecting the icon 1751 is sensed, the mobile terminal can immediately output the detail information 1711 of the first contact.

The mobile terminal can output the icon 1751 in a state that the home screen 1750 is outputted in full screen of the display unit instead of the multi-window region 1740. In this case, if an input signal for selecting the icon 1751 is sensed, the mobile terminal can output the detail information 1711 of the first contact in full screen of the display unit.

Figure 18:
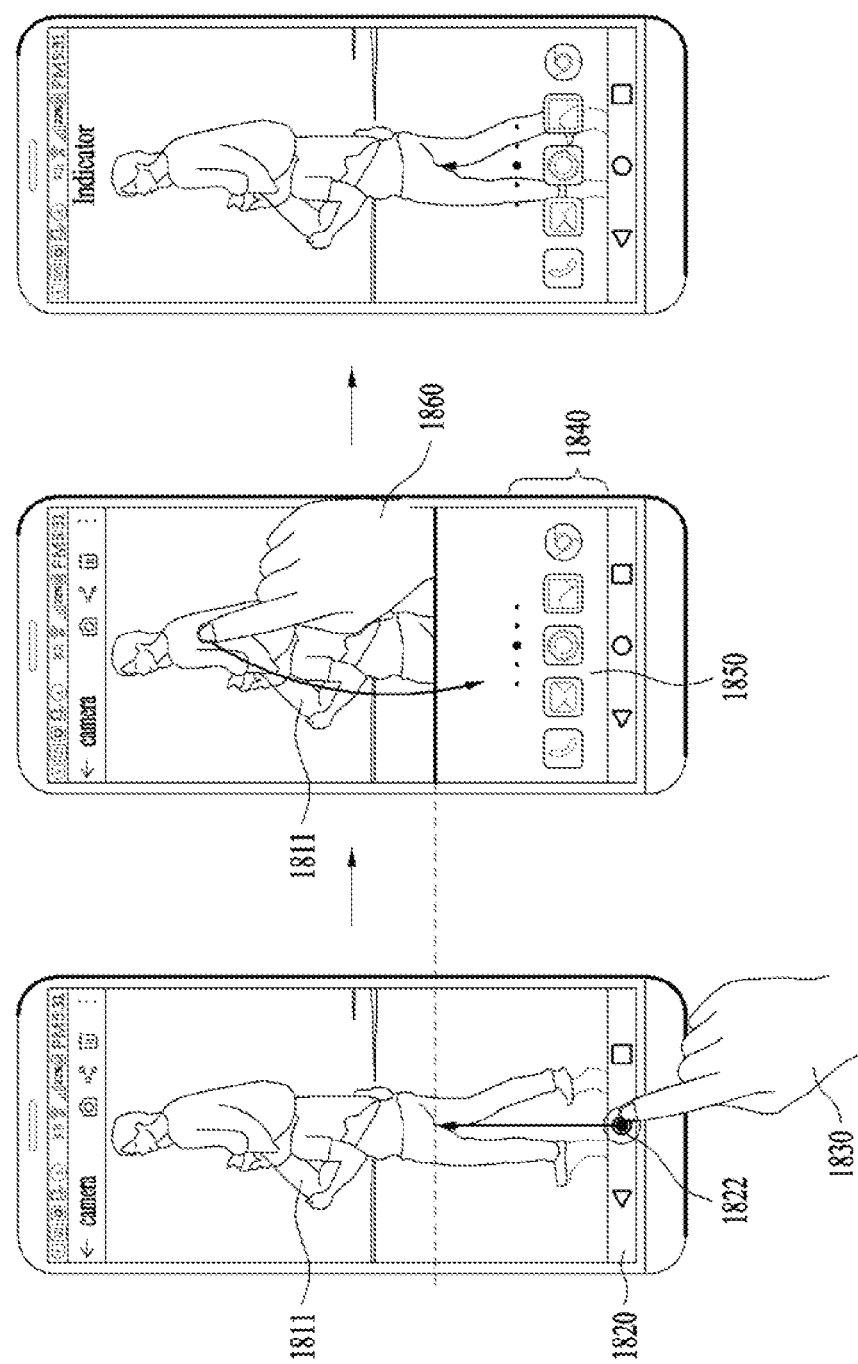
FIG. 18 is a diagram for explaining a further embodiment of outputting a home screen on a multi-window region in a mobile terminal according to one embodiment of the present invention.

FIG. 18 is a diagram for explaining an embodiment of outputting a home screen on a multi-window region in a mobile terminal according to a different embodiment of the present invention. In the embodiment of FIG. 18, explanation on content overlapped with the contents of FIGS. 4 to 17 is omitted.

Referring to the first drawing of FIG. 18, the mobile terminal can output a first image 1811 and a soft key 1820 including a second button 1822. According to one embodiment of the present invention, the mobile terminal can sense a first input signal 1830 that executes a multi-window mode by selecting the second button 1822.

Referring to a second drawing of FIG. 18, if the first input signal 1830 is sensed in a state that the first image 1811 is outputted, the mobile terminal can output a home screen 1850 including at least one icon on a multi-window region 1840 in a manner of reducing a size of the home screen.

In an embodiment of FIG. 18, similar to the embodiment of FIG. 17, if the first input signal 1830 is sensed, the mobile terminal can configure a bigger multi-window region 1840. In this case, the mobile terminal can output a home screen 1850 including more empty space except at least one icon on the multi-window region 1840.

According to one embodiment of the present invention, the mobile terminal can sense a second input signal 1860 for touching the first image 1811 for predetermined time and dragging the touch to an empty space outputted on the multi-window region 1840.

According to one embodiment of the present invention, if the second input signal 1860 is sensed, the mobile terminal can configure the first image 1811 as a background screen of the home screen 1850. In particular, if the home screen 1850 is outputted in full screen of the display unit, the mobile terminal can output the first image 1811 as a background screen of the full screen.

Figure 19:
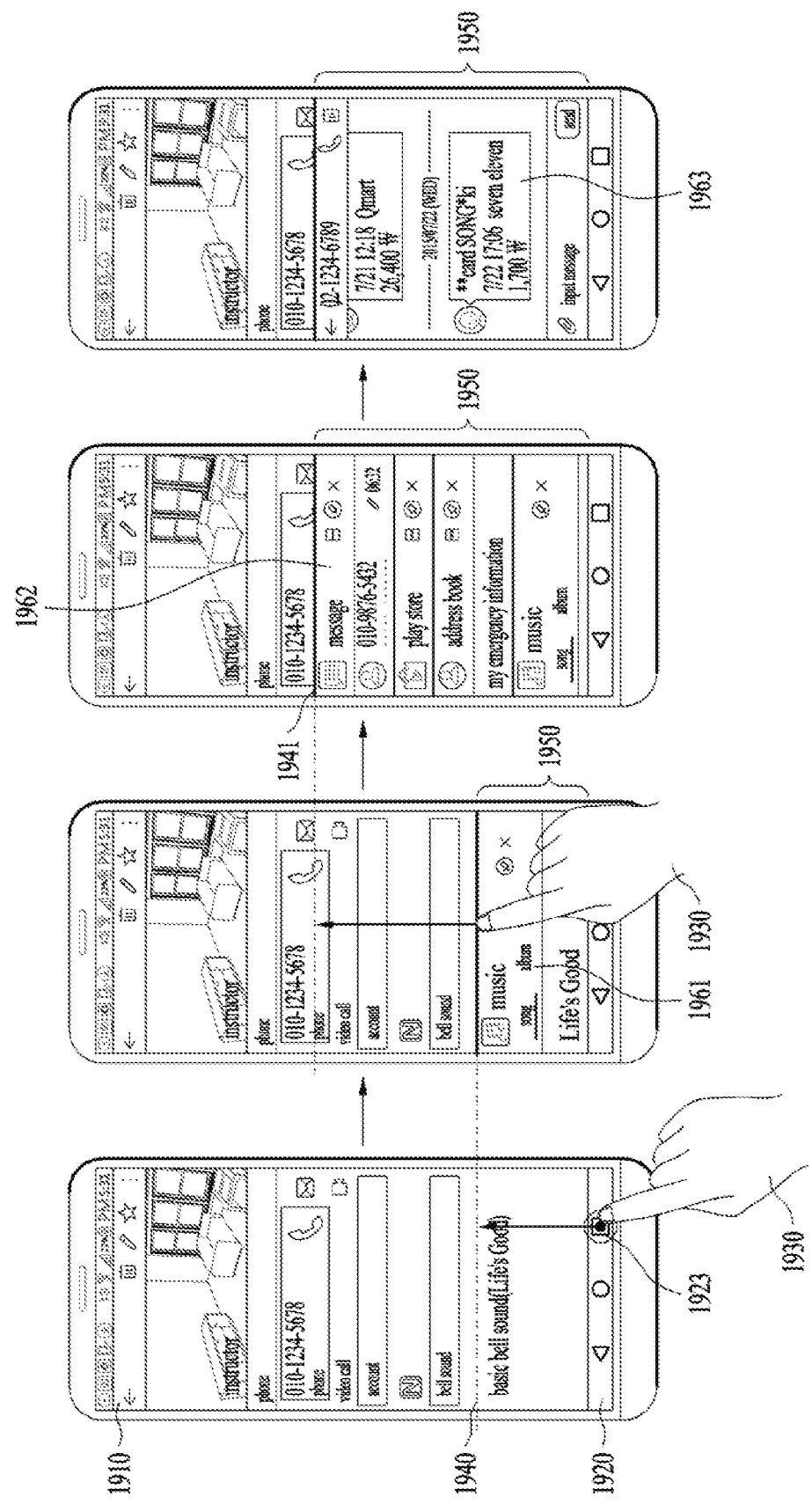
FIG. 19 is a diagram for explaining an embodiment of outputting an activated content list on a multi-window region in a mobile terminal according to one embodiment of the present invention.

FIG. 19 is a diagram for explaining an embodiment of outputting an activated content list on a multi-window region in a mobile terminal according to one embodiment of the present invention. In the embodiment of FIG. 19, explanation on content overlapped with the contents of FIGS. 4 to 18 is omitted.

Referring to the first drawing of FIG. 19, the mobile terminal can output first content 1910 and a soft key 1920 including a third button 1923. According to one embodiment of the present invention, the first content 1910 can include all applications.

According to one embodiment of the present invention, the mobile terminal can sense a first input signal 1930 for selecting the third button 1923. In this case, the first input signal may correspond to an input signal for touching the third button 1923 and dragging the touch to a first point 1940.

Referring to the second drawing of FIG. 19, if the first input signal 1930 is sensed, the mobile terminal can output a list 1960 of activated contents on a multi-window region 1950 in a state that the first content 1910 is outputted. In this case, the list 1960 of activated contents may correspond to a list of contents activated in the background of the mobile terminal listed by thumbnails. In this case, the first input signal 1930 may correspond to a touch input signal dragged to up direction. If the first input signal 1930 is sensed, the mobile terminal can control a size of the multi-window region 1950 to be enlarged.

As mentioned in the foregoing description, the mobile terminal can increase an amount of outputted detail information of the list of activated contents based on the size of the multi-window region 1950.

For example, the mobile terminal outputs a thumbnail 1961 of a first activated content on the multi-window region 1950 as a list of activated content in the second drawing of FIG. 19, whereas the mobile terminal can output thumbnails for 4 activated contents on the multi-window region 1950 as the list of activated content in the third drawing of FIG. 19.

As the size of the multi-window region 1950 increases, the number of outputted thumbnails of the activated contents can be gradually increased. For example, if a height of the multi-window region 1950 corresponds to a first length, the mobile terminal can output a thumbnail 1961 of a first activated content only on the multi-window region 1950. Yet, if the height of the multi-window region 1950 is extended to a second length, the mobile terminal can output thumbnails 1962 of second activated contents on the multi-window region 1950.

Referring to the third drawing of FIG. 19, the mobile terminal can output a list of activated contents including thumbnails of a plurality of activated contents on the multi-window region 1950. For example, the mobile terminal can output a thumbnail of a message application, a thumbnail of a play store application, a thumbnail of a contact application, and a thumbnail of a calendar application on the multi-window region 1950.

In this case, the mobile terminal can output a most recently executed background application at the top of the multi-window region 1950. For example, referring to FIG. 19, a message application corresponds to the most recently executed background application. Previously executed applications may sequentially correspond to a play store application, a contact application, and a calendar application.

According to one embodiment of the present invention, the mobile terminal can sense a location at which the touch of the first input signal 1930 is released. For example, referring to FIG. 19, the mobile terminal can detect that the touch of the first input signal 1930 is released at a second point 1941.

Referring to the fourth drawing of FIG. 19, if the mobile terminal senses that the touch of the first input signal 1930 is released at the second point 1941, the mobile terminal can output second activated content 1963 corresponding to a second activated content thumbnail 1962, which is outputted at the second point 1941, on the multi-window region 1950.

For example, a thumbnail of the message application can be outputted at the second point 1941. More specifically, the mobile terminal can output the message application corresponding to the thumbnail of the message application outputted at the second point 1941 on the multi-window region 1950.

In particular, a user touches a third button 1923 for predetermined time and drags the touch in predetermined direction to check a list of activated contents outputted on the multi-window region 1950.

When a thumbnail of activated content is outputted on the multi-window region 1950 among at least one or more activated contents included in the list of activated contents, a user can release a touch input at a point at which the thumbnail of the activated content is outputted to output the activated content. By doing so, the mobile terminal can output the activated content corresponding to the point at which the touch of the user is released on the multi-window region 1950.

Hence, a user can configure a region to a preferred point as the multi-window region 1950 in a state that the first content 1910 is outputted and execute a background application preferred by the user on the multi-window region 1950.

Figure 20:
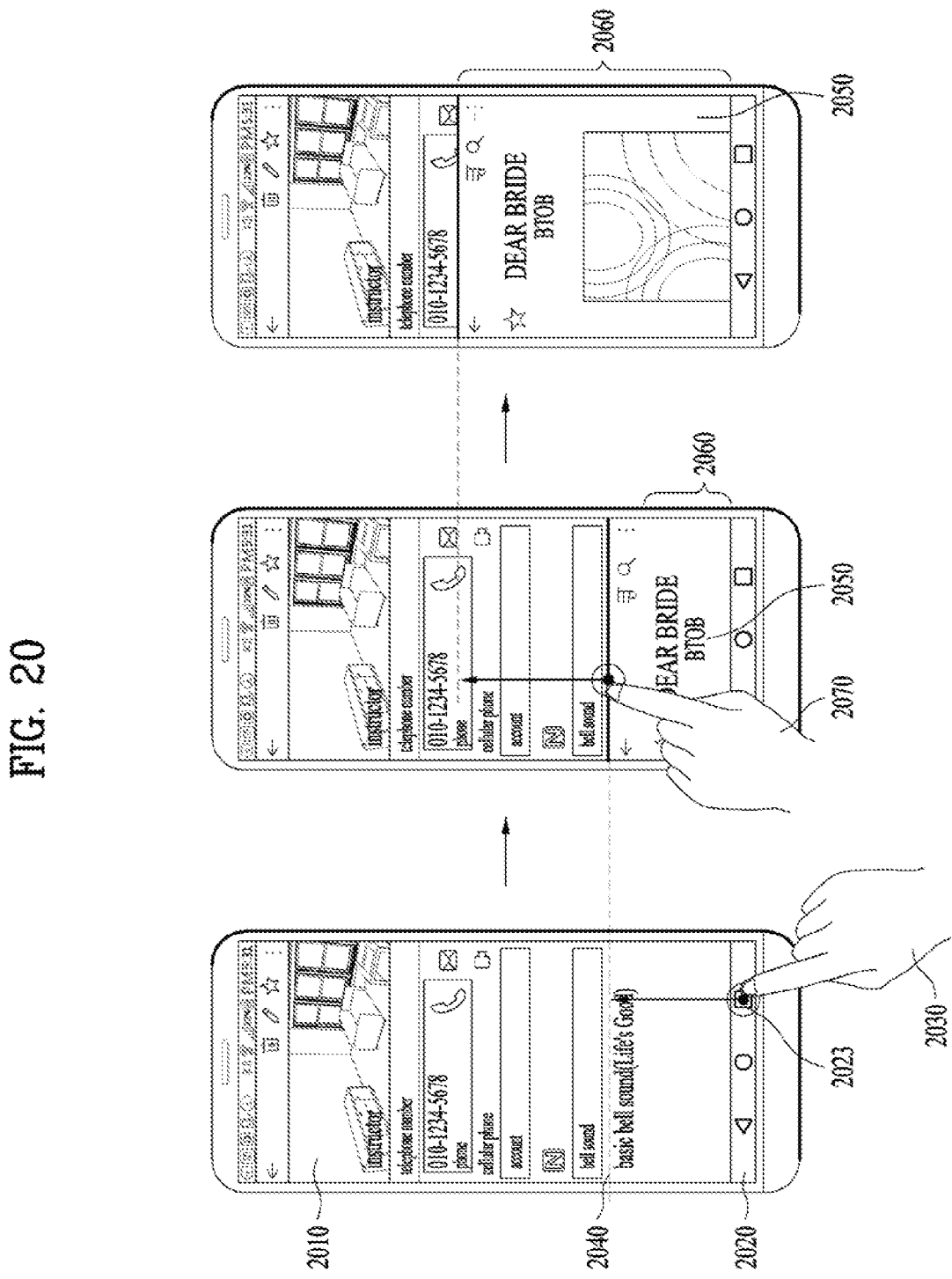
FIG. 20 is a diagram for explaining a different embodiment of outputting an activated content list on a multi-window region in a mobile terminal according to one embodiment of the present invention.

FIG. 20 is a diagram for explaining a different embodiment of outputting an activated content list on a multi-window region in a mobile terminal according to one embodiment of the present invention. In the embodiment of FIG. 20, explanation on content overlapped with the contents of FIGS. 4 to 19 is omitted.

Referring to the first drawing of FIG. 20, the mobile terminal can output first content 2010 and a soft key 2020 including a third button 2023. According to one embodiment of the present invention, the mobile terminal can sense a first input signal 2030 that selects the third button 2023.

The second drawing of FIG. 20 may correspond to the fourth drawing of FIG. 19. Referring to the second drawing of FIG. 20, if the mobile terminal senses that the touch of the first input signal 2030 is released at a first point 2040, the mobile terminal can output first activated content 2050 on the multi-window region 2060 in response to a thumbnail of the activated content thumbnail outputted at the first point 2040.

According to one embodiment of the present invention, the mobile terminal can sense a second input signal 2070 that selects a predetermined line of the multi-window region 2060. In this case, the predetermined line may correspond to an uppermost horizontal line of the multi-window region 2060.

Referring to the third drawing of FIG. 20, if the second input signal is sensed, the mobile terminal can control a size of the multi-window region 2060. According to one embodiment of the present invention, the mobile terminal can determine an amount of detail information of the first activated content 2050 outputted on the multi-window region 2060 based on the size of the multi-window region 2060.

If the mobile terminal senses the first input signal 2030 through the embodiment of FIG. 19, the mobile terminal can determine the amount of detail information of the first activated content 2050, which is outputted by sensing the second input signal 2070, after the first activated content 2050 is outputted on the multi-window region 2060.

It is apparent that the embodiments mentioned earlier in FIGS. 5 to 20 are usable in a manner of being combined with each other.

Figure 21:
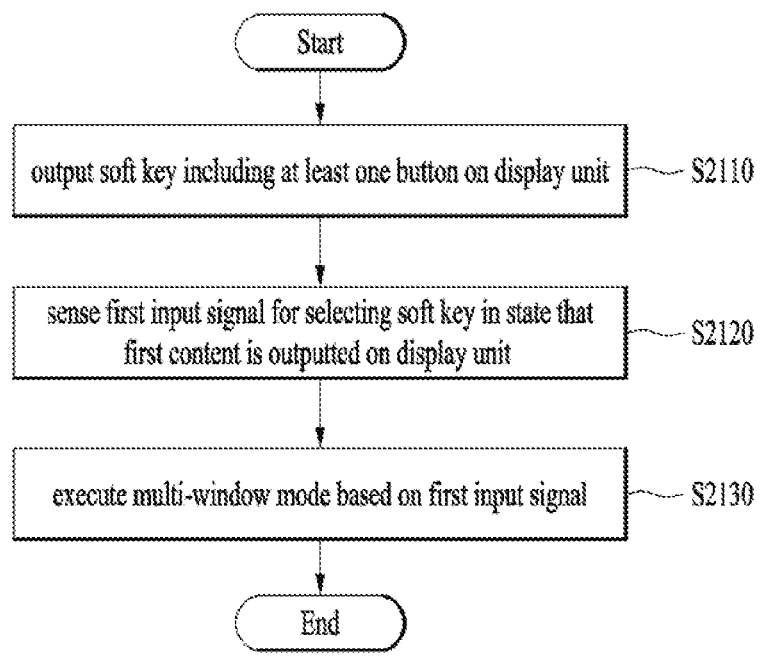
FIG. 21 is a flowchart for explaining an embodiment of outputting content on a multi-window region in a mobile terminal according to one embodiment of the present invention.

FIG. 21 is a flowchart for explaining an embodiment of outputting content on a multi-window region in a mobile terminal according to one embodiment of the present invention. In the following, each of steps shown in FIG. 21 can be controlled by the controller mentioned earlier in FIG. 1*a*.

In the step S2110, the mobile terminal can output a soft key including at least one button on the display unit. In this case, the soft key may correspond to a control key used for controlling content outputted on the display unit. According to one embodiment of the present invention, the soft key can include a first button, a second button, and a third button. And, for example, the soft key can include a back key, a home key, and a recent key.

In the step S2120, the mobile terminal can sense a first input signal for selecting the soft key in a state that first content is outputted. In this case, the first input signal may correspond to a touch input signal that drags a touch from a first point to a second point. In this case, a location of the first point may correspond to a button included in the soft key. For example, the location of the first point may correspond to a location at which a first button is outputted. And, a location of the second point may correspond to a partial point of the first content. According to one embodiment of the present invention, the mobile terminal can configure a multi-window region based on a distance between the first point and the second point.

In the step S2130, the mobile terminal can execute a multi-window mode based on the first input signal. In this case, the multi-window mode may correspond to a mode for outputting second content in a state that the first content is outputted on the display unit. According to one embodiment of the present invention, the mobile terminal can output the second content on the multi-window region which is configured based on the first input signal.

In particular, as mentioned in FIG. 21, it is apparent that the embodiments mentioned earlier in FIGS. 5 to 20 can be used as a method of controlling the mobile terminal.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:

1. A mobile terminal, comprising:
   a touchscreen configured to output a plurality of buttons; and
   a controller configured to:
      sense a first input signal for selecting a first button of the plurality of buttons in a state that first content is outputted on the touchscreen, wherein the first input signal corresponds to a touch input signal for dragging a touch from a first point to a second point, and wherein the first point corresponds to the selected first button; and
      execute a multi-window mode based on the first input signal, such that the first content is displayed in a first region of the touchscreen while second content corresponding to the selected first button is displayed in a second region of the touchscreen,
   wherein the second region is located between the plurality of buttons and the first region in the multi-window mode,
   wherein a size of the second region is adjusted in proportion to a distance of the first point and the second point along which the touch selecting the first button is dragged, and
   wherein the second content corresponding to the selected first button includes a previous screen of the first content.

2. The mobile terminal of claim 1, wherein the controller is further configured to:
sense a second input signal for selecting a first object, which is outputted on the second content; and
control a function corresponding to the first object to be performed on the first content.

3. The mobile terminal of claim 2, wherein the second input signal corresponds to an input signal for touching the first object, dragging the touch, and releasing the touch on the first content.

4. The mobile terminal of claim 2, wherein if the first object corresponds to a file, the controller is further configured to control the file to be executed on the first content.

5. The mobile terminal of claim 1, wherein the controller is further configured to:
sense a third input signal for selecting a second button of the plurality of buttons; and
control a home screen containing at least one icon to be outputted as the second content, wherein the home screen comprises a first icon.

6. The mobile terminal of claim 5, wherein the controller is further configured to:
sense a fourth input signal for selecting a second object, which is outputted on the first content; and
terminate the multi-window mode and execute third content corresponding to the first icon on the touchscreen, wherein the third content is outputted while information on the second object is contained in the third content.

7. The mobile terminal of claim 6, wherein the fourth input signal corresponds to a touch input signal for touching the second object and dragging the touch to a location at which the first icon is outputted.

8. The mobile terminal of claim 5, wherein the controller is further configured to:
sense a fifth input signal for selecting a third object, which is outputted on the first content; and
control a second icon corresponding to the third object to be generated and outputted on the home screen.

9. The mobile terminal of claim 8, wherein the fifth input signal corresponds to an input signal for touching the third object, dragging the touch, and releasing the touch on an empty space of the home screen.

10. The mobile terminal of claim 8, wherein if the third object corresponds to an image, the controller is further configured to control the image to be outputted as a background screen of the home screen.

11. The mobile terminal of claim 1, wherein the controller is further configured to:
sense a sixth input signal for selecting a third button of the plurality of buttons; and
control a list of activated contents to be outputted as the second content,
wherein the list of activated contents corresponds to a list of at least one or more contents currently activated at background of the mobile terminal outputted in a thumbnail form.

12. The mobile terminal of claim 11, wherein the controller is further configured to determine a number of activated contents contained in the outputted list of activated contents based on the size of the second region.

13. The mobile terminal of claim 11, wherein the controller is further configured to control a first activated content corresponding to a location at which the touch of the sixth input signal is released to be outputted on the second region as the second content.

14. The mobile terminal of claim 1, wherein the controller is further configured to determine an amount of detail information of the outputted second content based on the size of the second region.

15. The mobile terminal of claim 1, wherein the controller is further configured to:
sense a seventh input signal for selecting a predetermined line of the second region; and
adjust the size of the second region according to the seventh input signal.

16. A method of controlling a mobile terminal, the method comprising:
outputting a plurality of buttons on a touchscreen;
sensing a first input signal for selecting a first button of the plurality of buttons in a state that first content is outputted on the touchscreen, wherein the first input signal corresponds to a touch input signal for dragging a touch from a first point to a second point, and wherein the first point corresponds to the selected first button; and
executing a multi-window mode based on the first input signal, such that the first content is displayed in a first region of the touchscreen while second content corresponding to the selected first button is displayed in a second region of the touchscreen,
wherein the second region is located between the plurality of buttons and the first region in the multi-window mode,
wherein a size of the second region is adjusted in proportion to a distance of the first point and the second point along which the touch selecting the first button is dragged, and
wherein the second content corresponding to the selected first button includes a previous screen of the first content.

* * * * *